United States Patent
Jensen

(10) Patent No.: US 12,257,800 B2
(45) Date of Patent: *Mar. 25, 2025

(54) FOOTWEAR MOULDING SYSTEM FOR DIRECT INJECTION PRODUCTION OF FOOTWEAR

(71) Applicant: ECCO Sko A/S, Bredebro (DK)

(72) Inventor: Frank Jensen, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,665

(22) Filed: Sep. 6, 2023

(65) Prior Publication Data
US 2023/0415438 A1 Dec. 28, 2023

Related U.S. Application Data

(63) Continuation of application No. 17/540,689, filed on Dec. 2, 2021, now Pat. No. 11,772,347.

(30) Foreign Application Priority Data

Dec. 2, 2020 (DK) .............................. PA202070810

(51) Int. Cl.
*B29D 35/00* (2010.01)
*B29D 35/06* (2010.01)

(52) U.S. Cl.
CPC ..... *B29D 35/0045* (2013.01); *B29D 35/0027* (2013.01); *B29D 35/061* (2013.01)

(58) Field of Classification Search
CPC ............ B29D 35/0045; B29D 35/0027; B29D 35/061; B29D 35/0009; B29D 35/0018
See application file for complete search history.

(56) References Cited

U.S. PATENT DOCUMENTS

| | | |
|---|---|---|
| 3,504,079 A | 3/1970 | Hall |
| 3,523,333 A | 8/1970 | Taylor et al. |
| 3,547,602 A | 12/1970 | Taylor |
| 3,632,278 A | 1/1972 | Hall et al. |
| 3,718,726 A | 2/1973 | Taylor |
| 3,840,310 A | 10/1974 | Klee et al. |
| 3,852,005 A | 12/1974 | Sculati et al. |
| 3,855,657 A | 12/1974 | Mazzotta |

(Continued)

FOREIGN PATENT DOCUMENTS

| | | |
|---|---|---|
| EP | 1190828 | 3/2002 |
| EP | 3626441 A1 | 3/2020 |

(Continued)

OTHER PUBLICATIONS

Office Action for U.S. Appl. No. 17/540,689, mailed on Sep. 15, 2022, Jensen, "Footwear Moulding System for Direct Injection Production of Footwear", 13 pages.

(Continued)

*Primary Examiner* — Emmanuel S Luk
(74) *Attorney, Agent, or Firm* — Lee & Hayes, P.C.

(57) ABSTRACT

A footwear moulding system for direct injection production of footwear includes a supporting mould, a last, an in-mould, and an injection channel. The supporting mould includes at least an in-mould support. The in-mould is elastomeric and the in-mould includes an in-mould outer surface configured to be supported by said in-mould support. The in-mould support includes at least one support side mould and a support bottom mould.

20 Claims, 16 Drawing Sheets

(56) References Cited

U.S. PATENT DOCUMENTS

| | | |
|---|---|---|
| 4,217,081 A | 8/1980 | Rooney |
| 4,817,305 A | 4/1989 | Wetzel |
| 4,886,238 A | 12/1989 | Davis |
| 5,435,959 A | 7/1995 | Williamson et al. |
| 5,871,683 A | 2/1999 | Schaper et al. |
| 5,891,484 A | 4/1999 | Strussmann |
| 6,226,895 B1 | 5/2001 | McClelland |
| 8,147,740 B2 | 4/2012 | Hansen |
| 9,706,815 B2 | 7/2017 | Spampinato |
| 2002/0030295 A1 | 3/2002 | De Winter et al. |
| 2004/0143995 A1 | 7/2004 | McClelland |
| 2005/0116383 A1 | 6/2005 | Sommerlund et al. |
| 2015/0050379 A1 | 2/2015 | Ginns et al. |
| 2015/0210028 A1 | 7/2015 | Hansen |
| 2016/0073732 A1 | 3/2016 | Ernst et al. |
| 2016/0150855 A1 | 6/2016 | Peyton |
| 2016/0257084 A1 | 9/2016 | Chen |
| 2016/0354987 A1 | 12/2016 | Baggen |
| 2019/0073709 A1 | 3/2019 | Hayes et al. |
| 2019/0329511 A1 | 10/2019 | Hernandez Hernandez et al. |
| 2020/0187592 A1 | 6/2020 | Peyton |
| 2021/0379853 A1 | 12/2021 | Hansen et al. |
| 2022/0000212 A1 | 1/2022 | Busbee |
| 2022/0055269 A1 | 2/2022 | Mortensen et al. |
| 2022/0152963 A1 | 5/2022 | Hansen et al. |
| 2022/0168984 A1 | 6/2022 | Jensen |

FOREIGN PATENT DOCUMENTS

| | | |
|---|---|---|
| FR | 2083185 | 12/1971 |
| GB | 1226957 | 3/1971 |
| GB | 2456250 | 7/2009 |
| JP | H07256790 | 10/1995 |
| JP | 3050905 | 8/1998 |
| WO | 2013053323 | 4/2013 |
| WO | WO2015132751 A2 | 9/2015 |
| WO | WO2015132751 A3 | 9/2015 |
| WO | WO2020182260 A1 | 9/2020 |

OTHER PUBLICATIONS

The Engineering Toolbox, "Thermal Conductivity of common Materials and Gases", retrieved at <<https://web.archive.org/web/20171107060713/https://www.engineeringtoolbox/thermal-conductivity-d_429.html>>, 2017, 16 pgs.

The Engineering Toolbox,, "Plastics—Thermal Conductivity Coefficients", retrieved at <<https://www.engineeringtoolbox.com/thermal-conductivity-plastics-d_1786.html>>, 2019, 5 pgs.

Figure 1A:
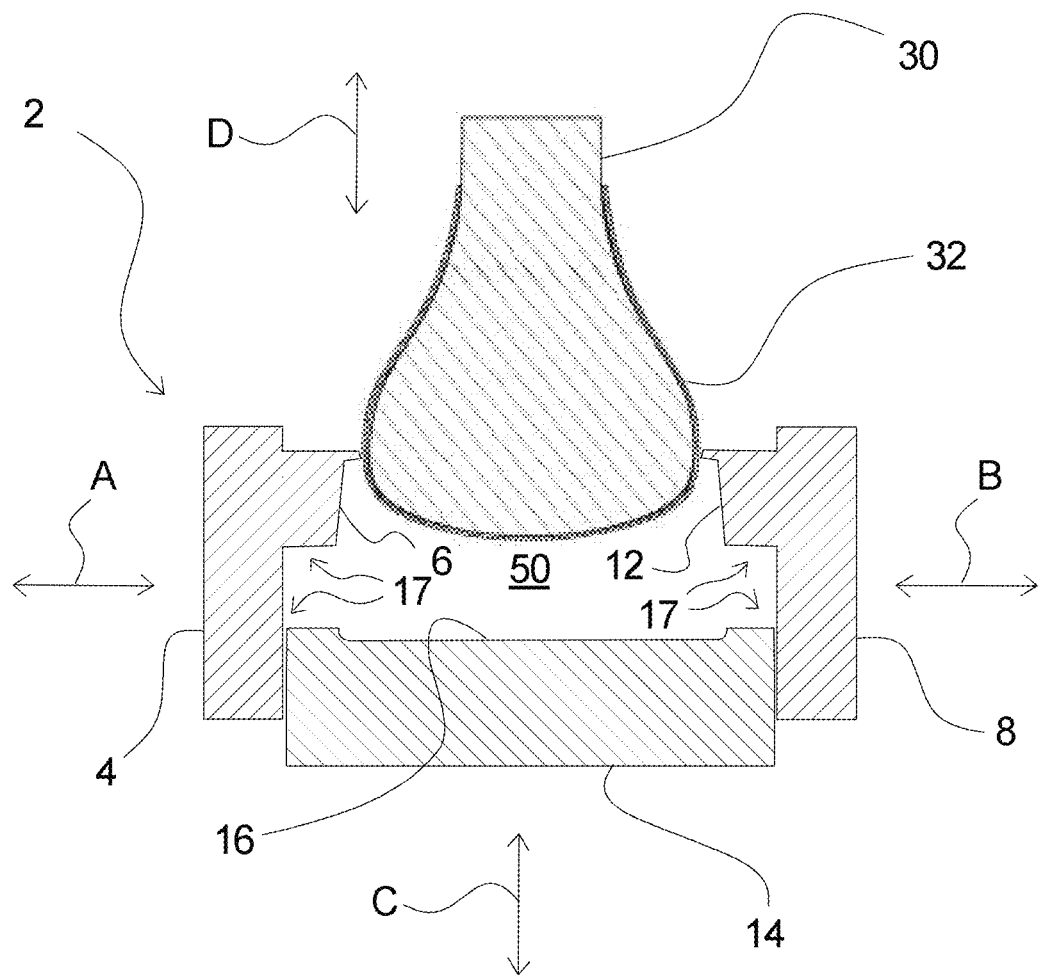
Figure 1B:
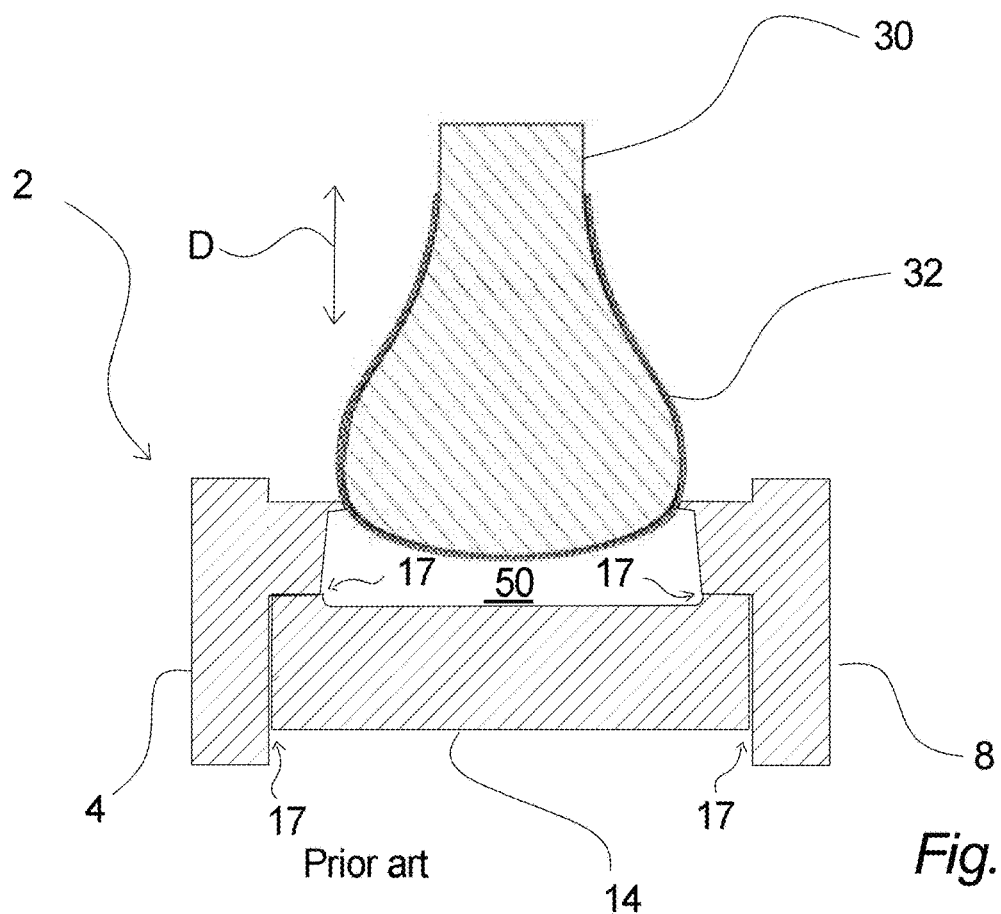
Figure 1C:
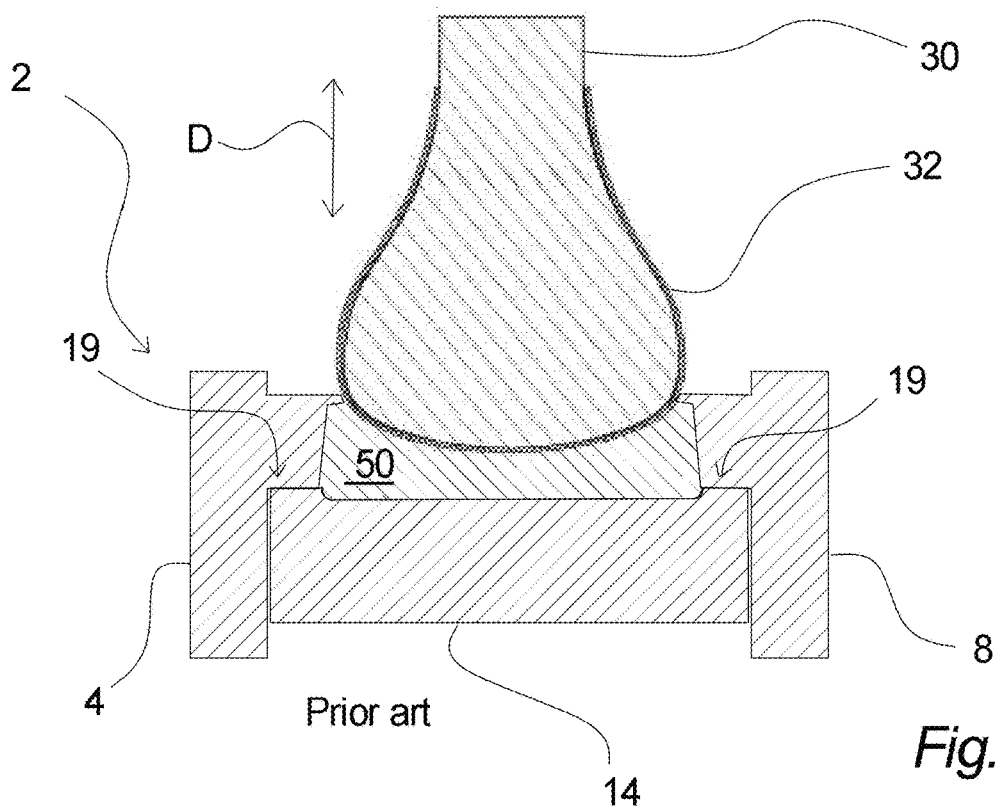
Figure 1D:
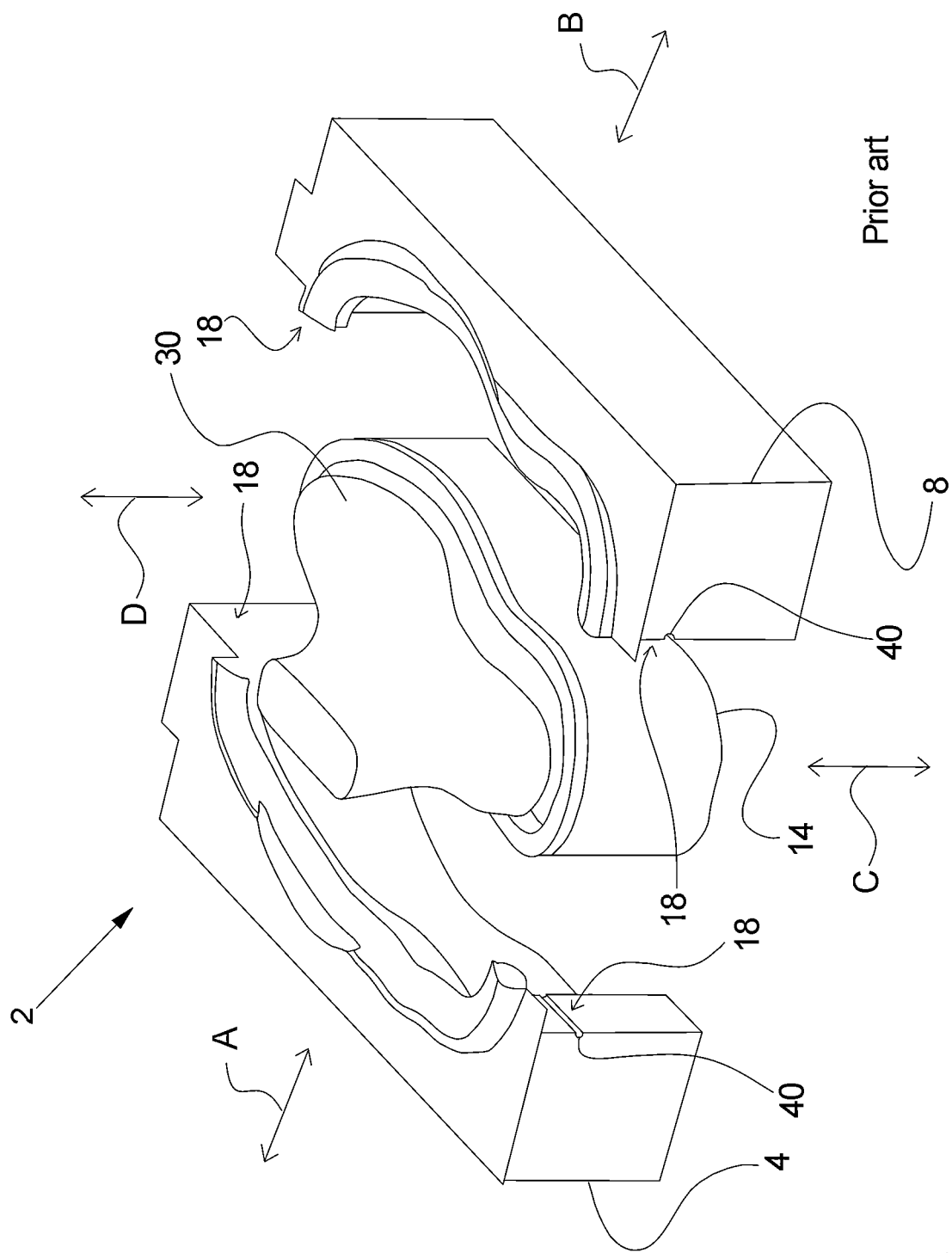
Figure 1E:
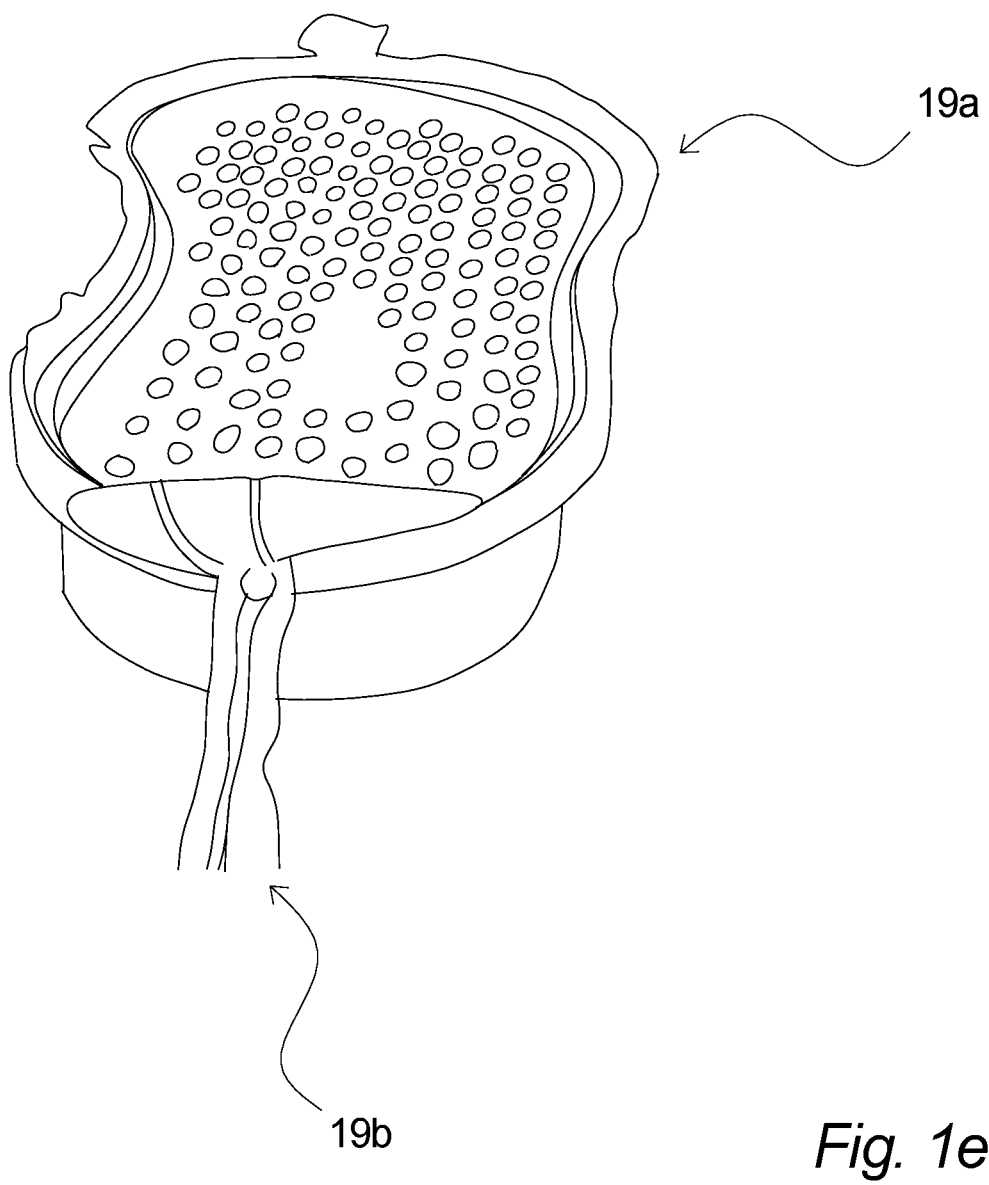
Figure 2:
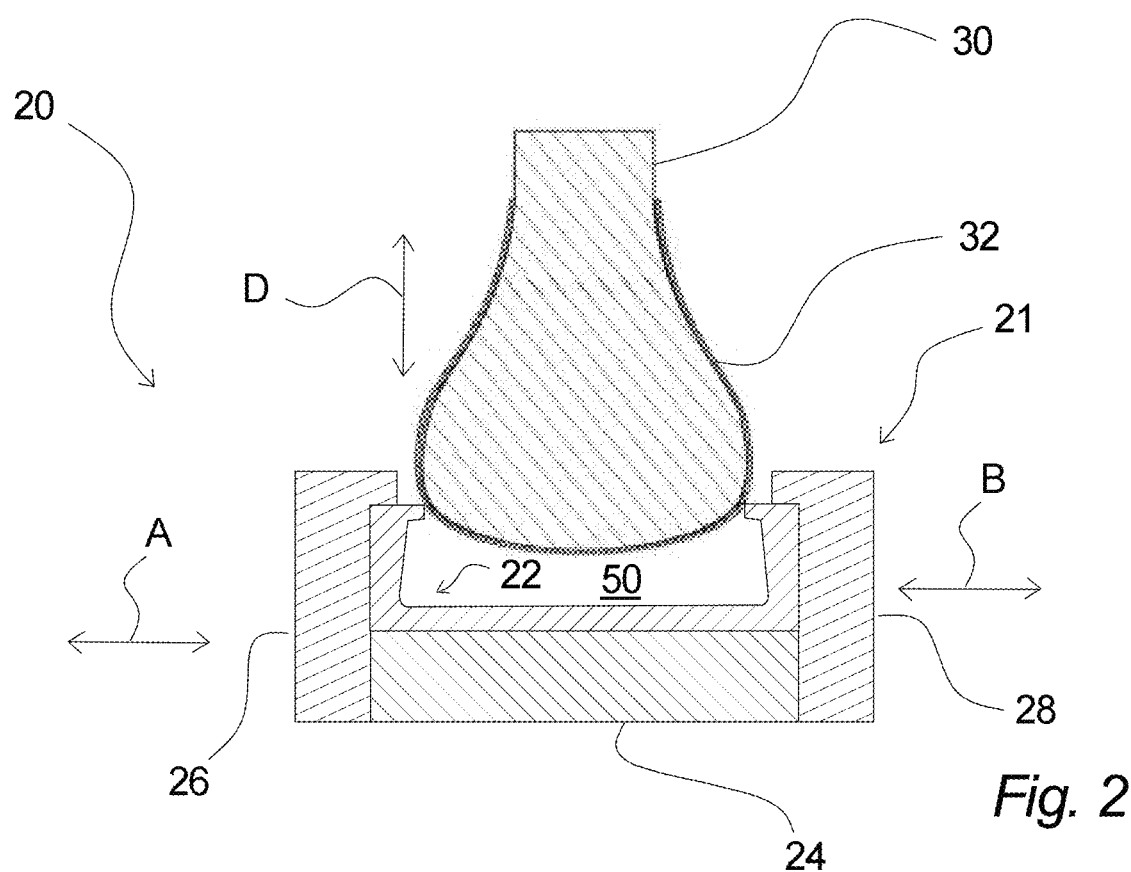

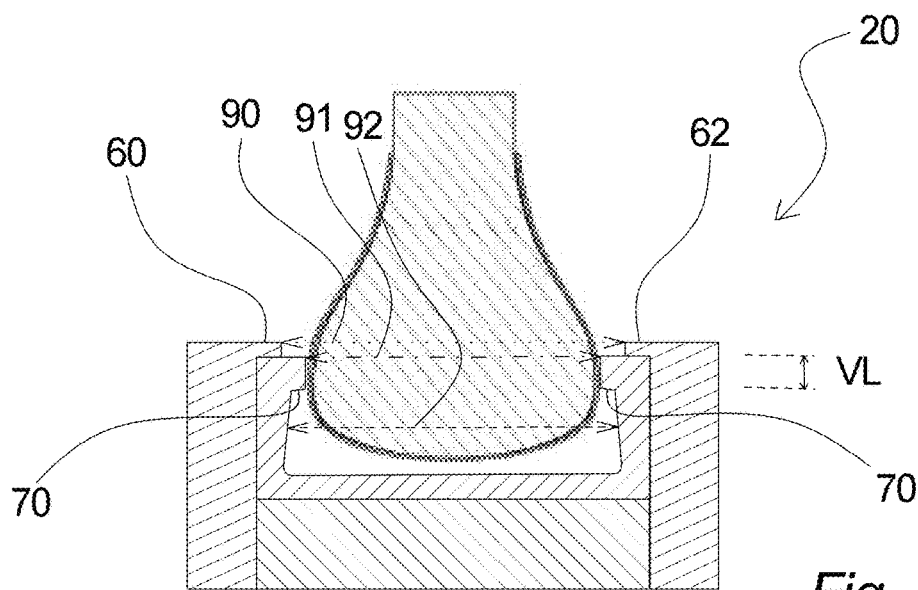
*Fig. 8a1*
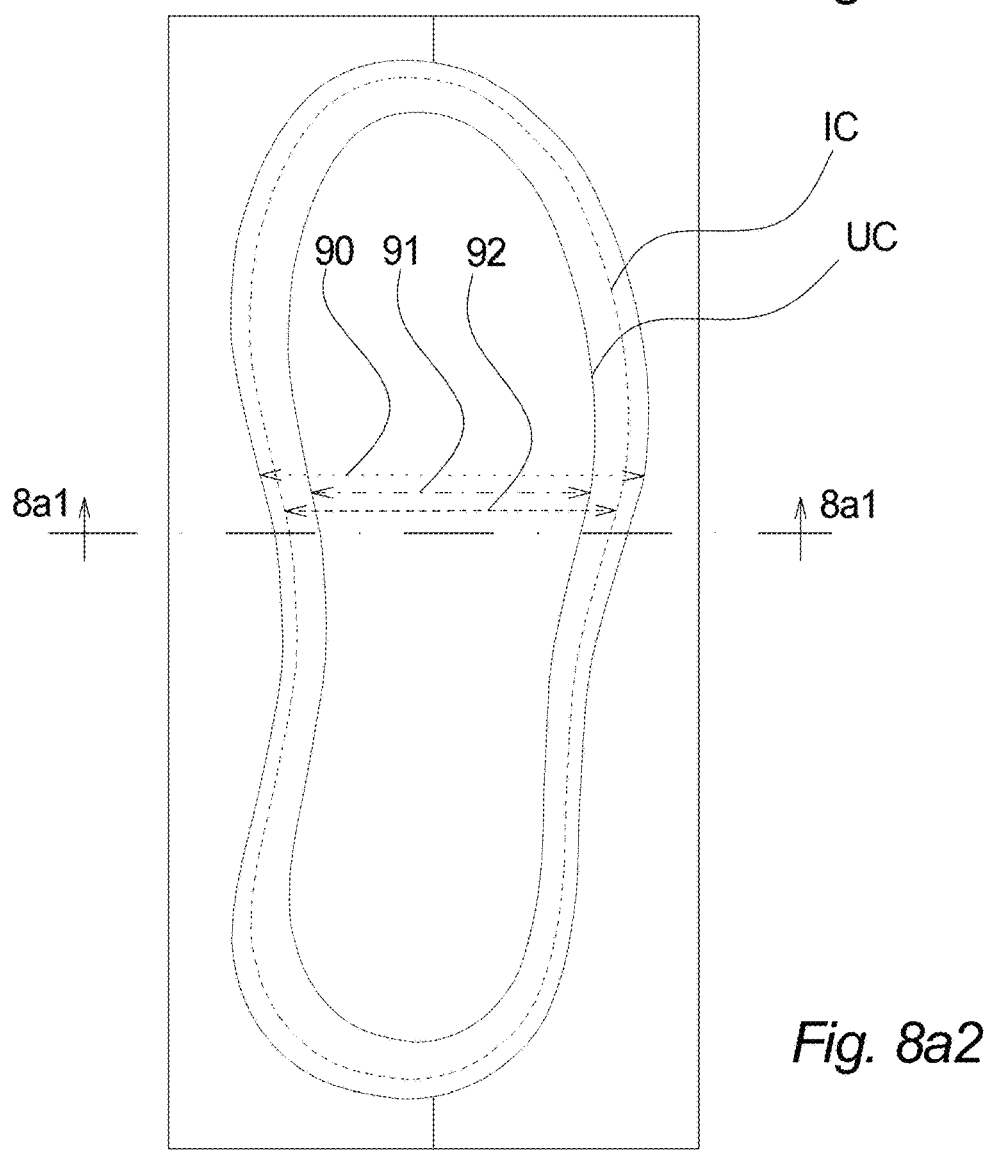
*Fig. 8a2*

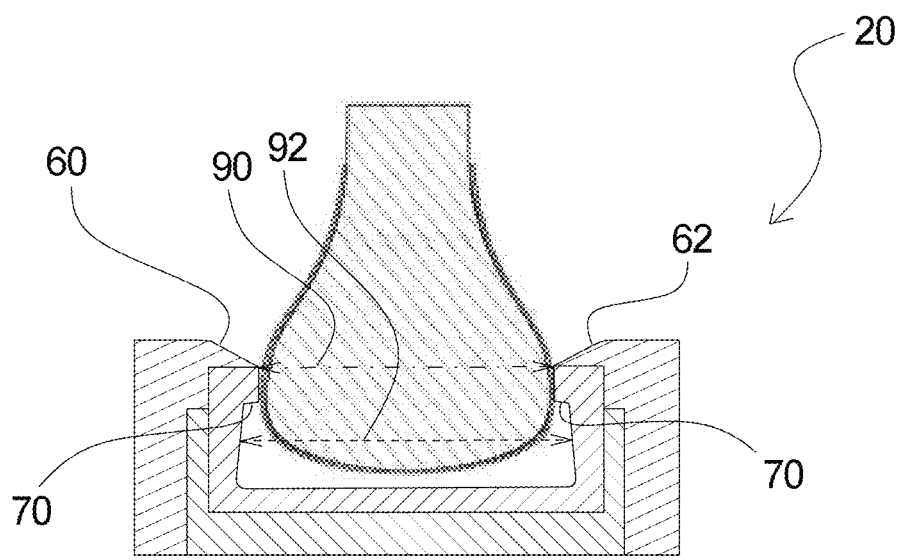
Fig. 8b1
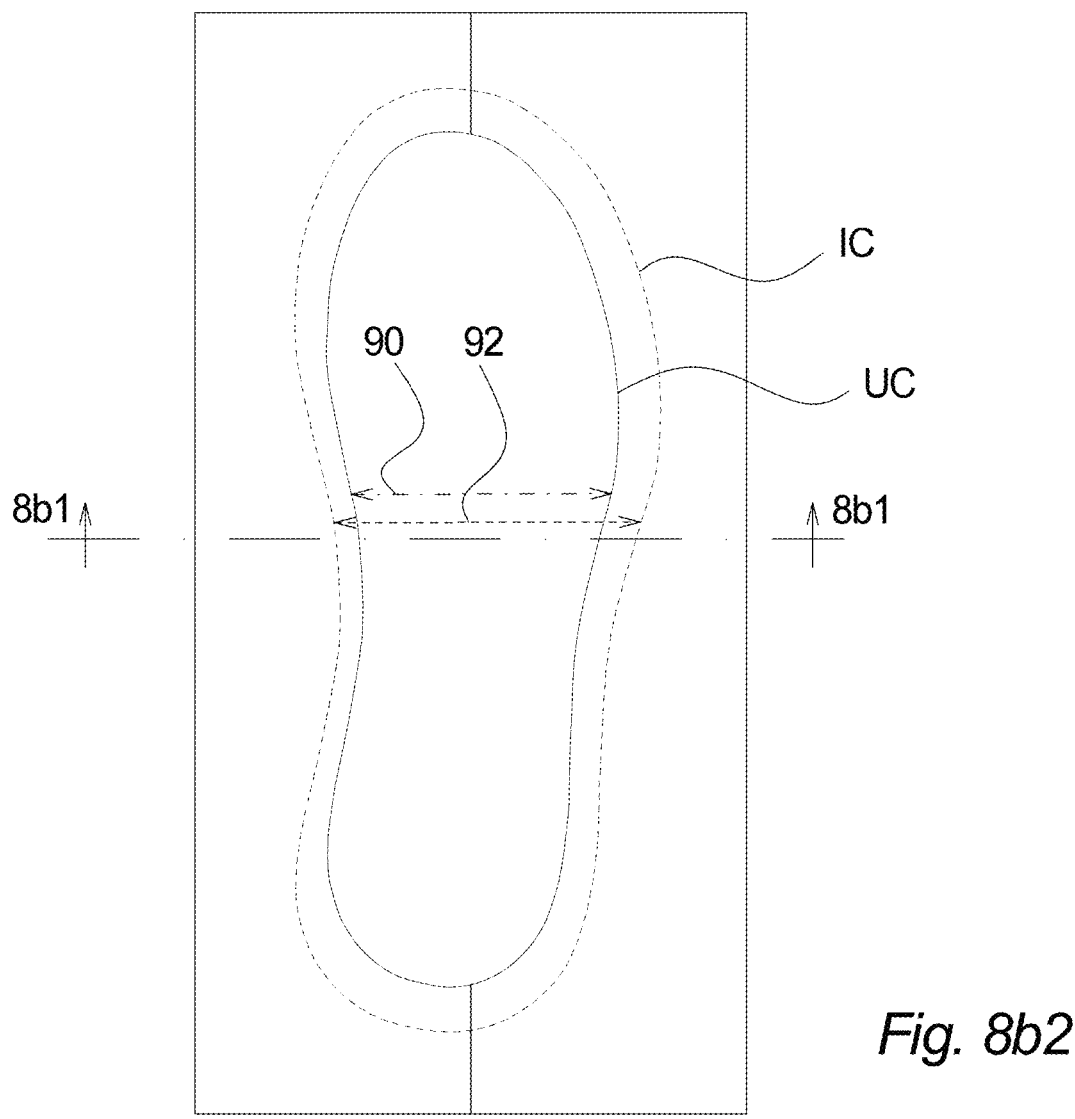
Fig. 8b2

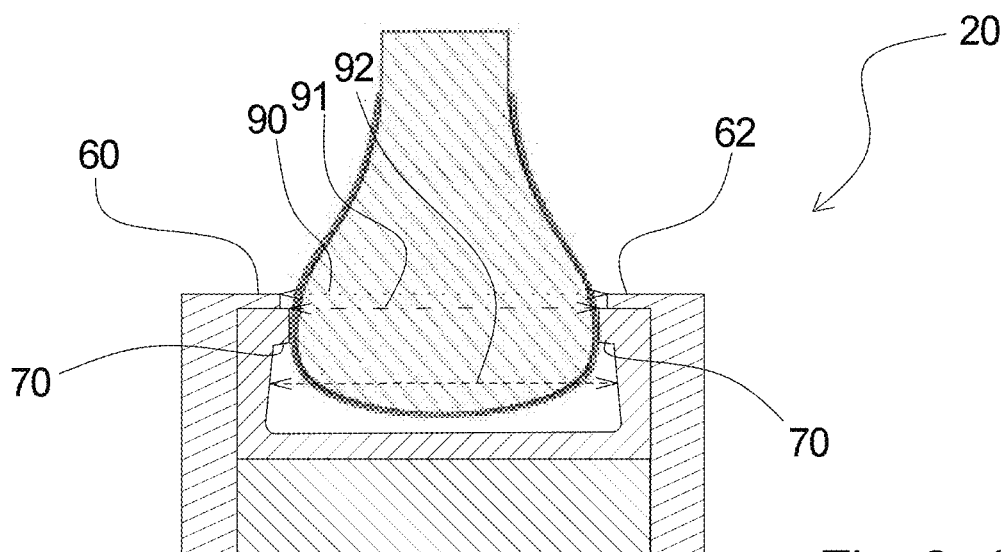
*Fig. 8c1*
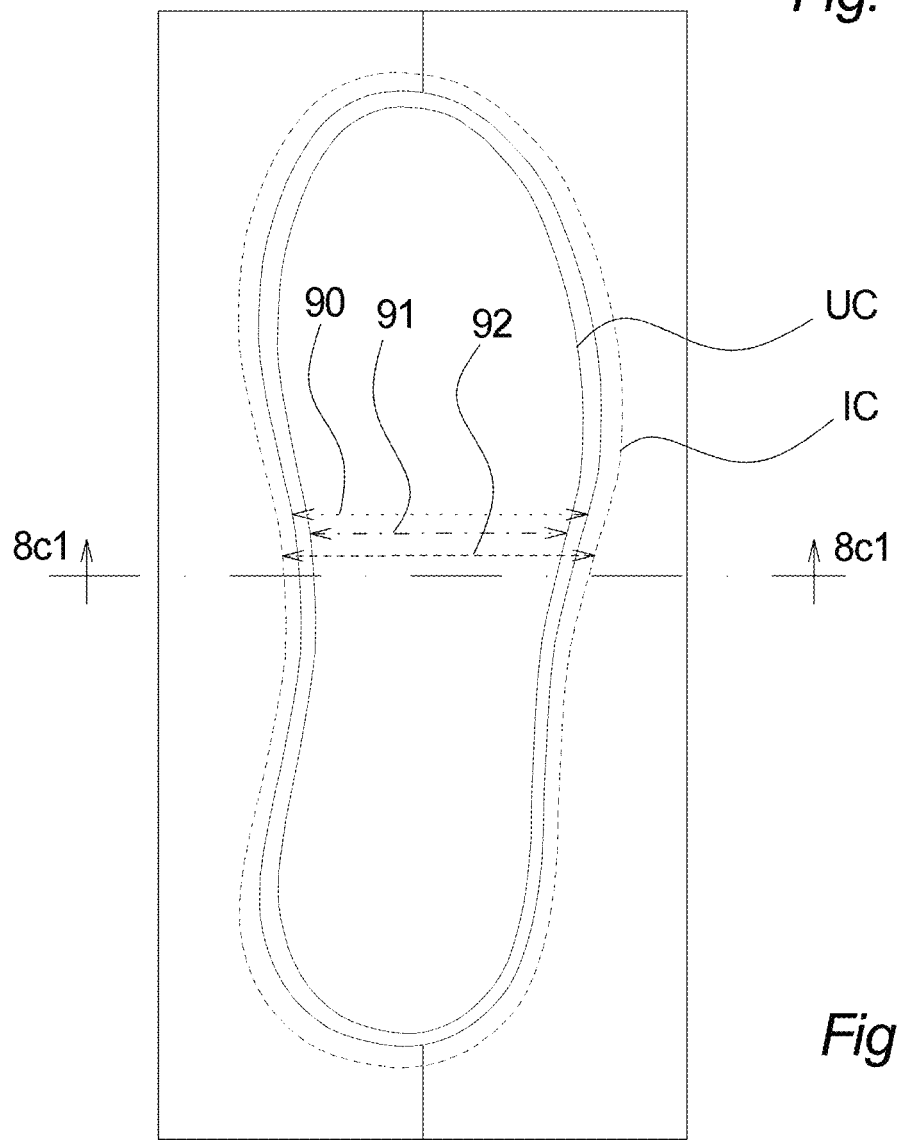
*Fig. 8c2*

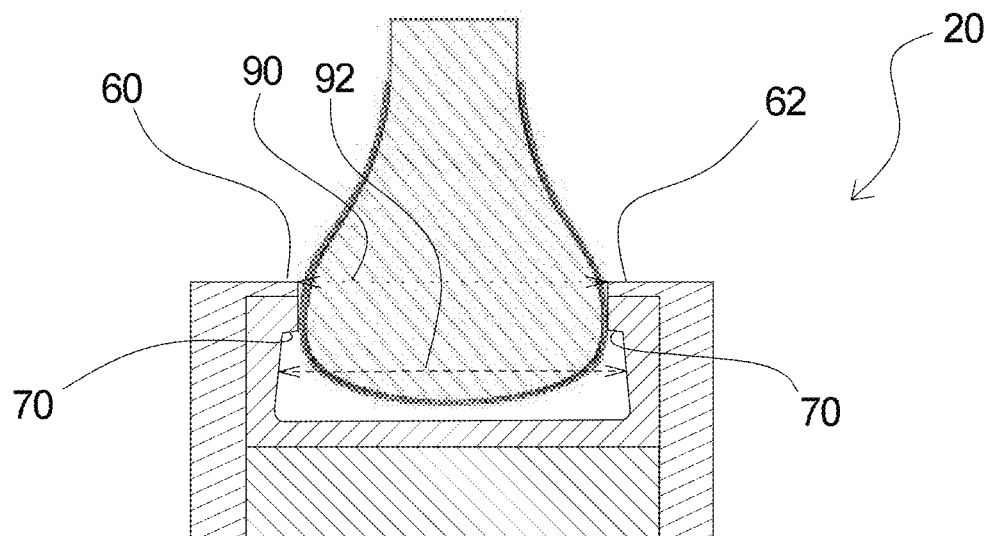
*Fig. 8d1*
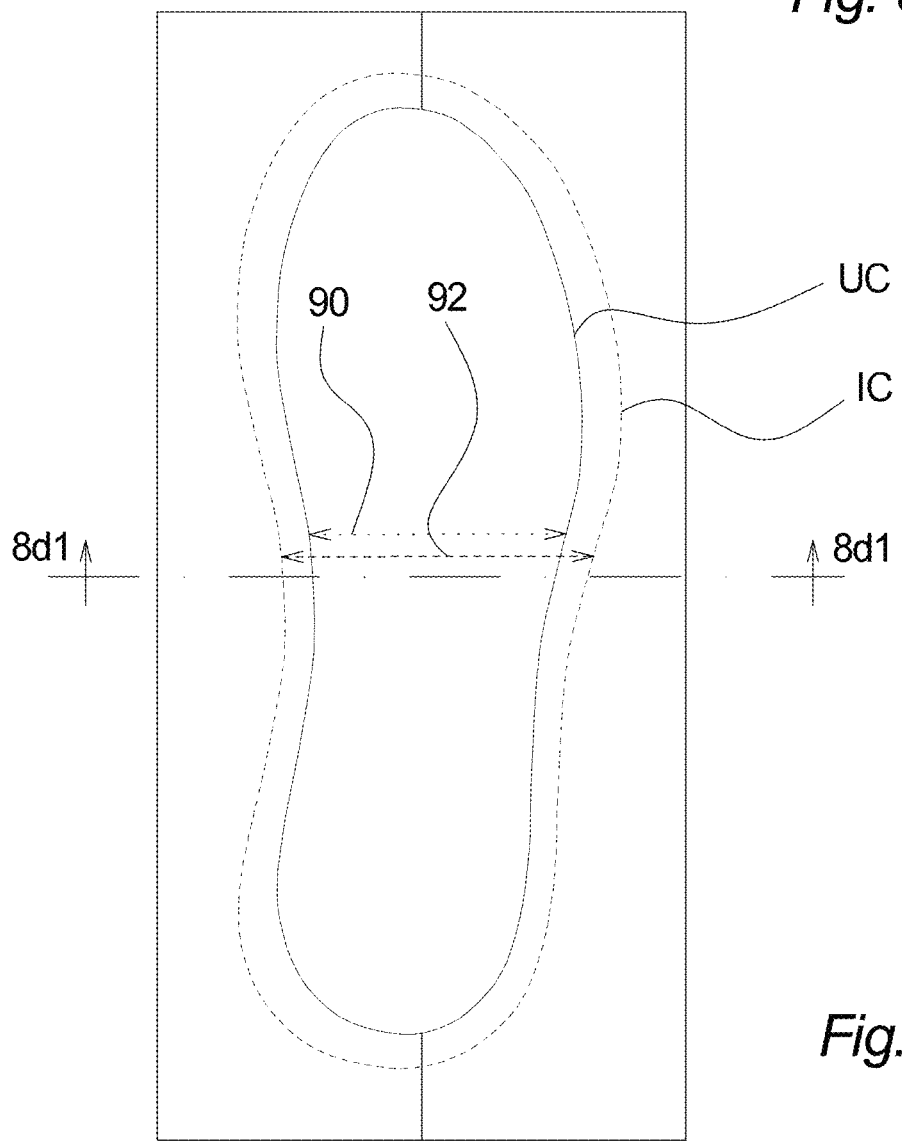
*Fig. 8d2*

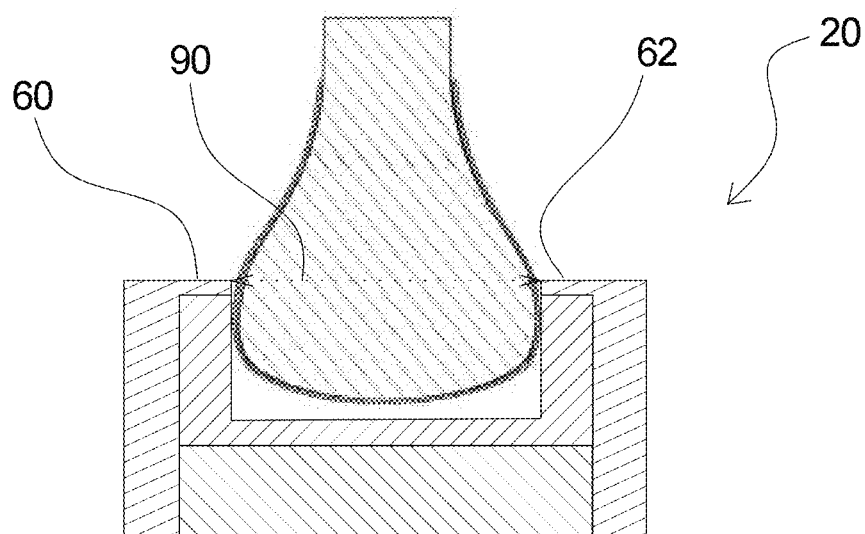
*Fig. 8e1*
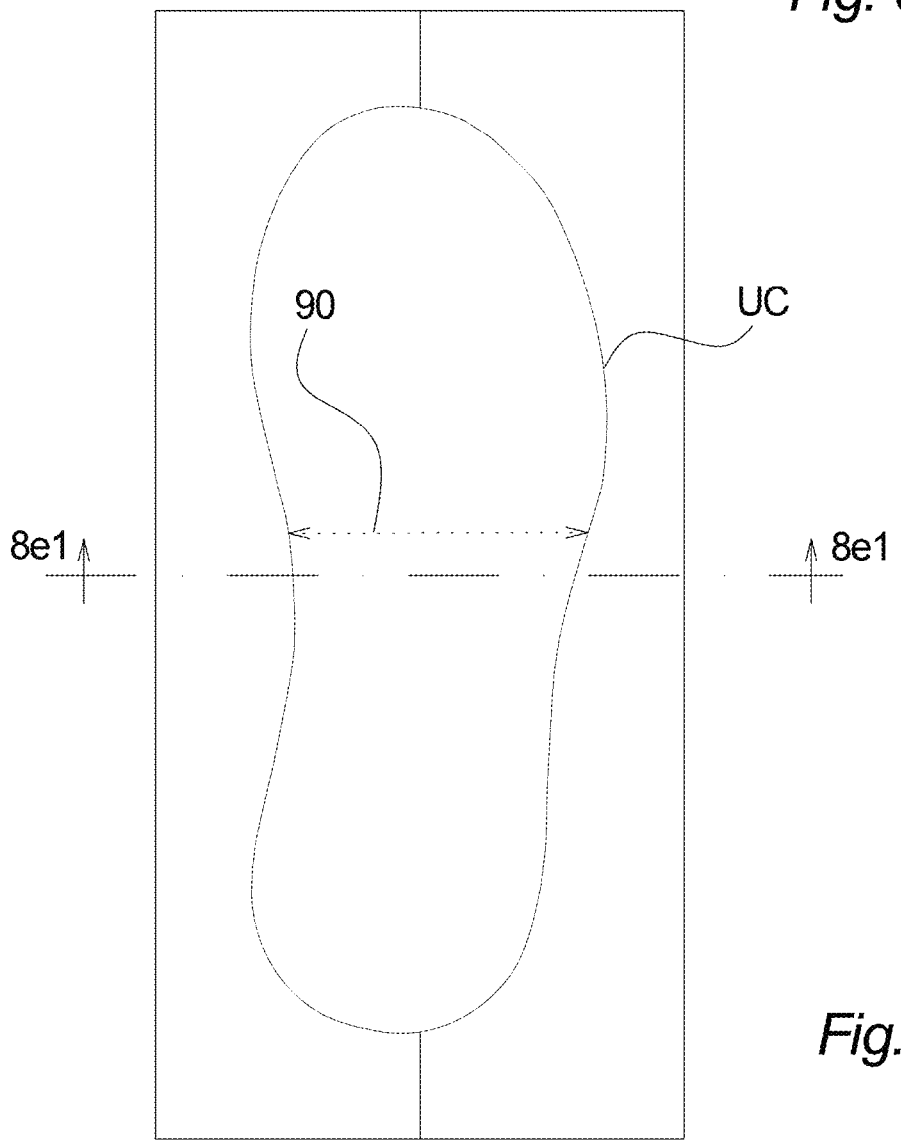
*Fig. 8e2*

FOOTWEAR MOULDING SYSTEM FOR DIRECT INJECTION PRODUCTION OF FOOTWEAR

CROSS REFERENCE TO RELATED APPLICATIONS

This application claims priority to U.S. application Ser. No. 17/540,689, filed Dec. 2, 2021, which claims priority to DK Patent Application No. PA 202070810, filed Dec. 2, 2020, the contents of each of which is incorporated herein by reference.

FIELD OF THE INVENTION

The invention relates to a footwear moulding system for direct injection production of footwear and a direct injection production method for moulding of footwear.

BACKGROUND OF THE INVENTION

It is well-known to manufacture footwear by means of direct injection moulding of the sole to the upper.

The direct injection process (DIP) is advantageous in many ways as the manufactured footwear may be produced to possess both flexibility and strength at the same time.

A challenge in relation to such a direct injection process is that the method creates a sole material waste to be trimmed off manually after each injection.

GB 1226957 A describes a footwear moulding system for use in the moulding of shoe bottom units onto shoes. This footwear moulding system comprises a sole mould member provided with a recess having the form of a shoe bottom unit, which recess is bounded by a peripheral wall. In an embodiment of this prior art, a sheet-like portion of a resiliently deformable silicone rubber extends across the recess of the sole mould member to cover the recess and an upwardly facing surface of the peripheral wall to provide a moulding surface of the recess of the sole mould member.

SUMMARY OF THE INVENTION

The invention relates in a first aspect to a footwear moulding system for direct injection production of footwear, said moulding system comprising
  a supporting mould,
  a last,
  an in-mould, and
  an injection channel,
  wherein the supporting mould comprises at least an in-mould support,
  wherein the in-mould is elastomeric and wherein the in-mould comprises an in-mould outer surface configured to be supported by said in-mould support, and
  wherein the in-mould support comprises at least one support side mould and a support bottom mould.

Hereby, a flexible moulding system for direct injection of footwear is achieved for the production of a range of footwear e.g. different designs, different sizes, different types e.g. left/right, etc., and whereby the production may be performed in a cost-efficient manner. The soles manufactured by a direct injection process are not manufactured directly in a moulding cavity of the mould parts where joints of the mould parts enable material bleeding and consequently necessary trimming operations after the manufacturing. The in-mould provides joints free manufacturing, as it may be configured to cover any joint with its outer surface, e.g. joints between the at least one support side mould and the support bottom mould, joints between support side moulds, etc., whereby material bleeding and trimming operations are avoided or minimized, leaving e.g. only possible trimming dictated by the injection, e.g. material from an injection channel. Further, operation of the processes is easier, simpler and eliminates cleaning operations where harmful agents may be used.

Further, by the invention it is achieved that a wide range of designs can be produced by the moulding system without replacing or renewing all parts, such as the side and bottom moulds. Hereby, the moulding tools becomes more reusable where only the in-mould is changed for the manufacturing of soles with different designs, sizes, etc.

It is noted that the kind of in-mould applied in an embodiment of the present invention makes it possible to geometrically define and DIP (direct-injection process) mould a sole onto a footwear upper with the use of the inventive in-mould with no "bleeding" between two not completely ideal mould parts as the in-mould may be provided in one singular non assembled entity covering the complete outsole, including a tight closing of the mould around the complete lower circumference of the upper.

It should in this context be noted that the tight closing of the mould may in an embodiment of the invention be obtained not only through the use of the in-mould, but also by a proper mould support ensuring that the flexible in-mould around its upper circumference loses shape as a result of expanding of the DIP material during the curing of the sole onto the upper.

Elastomeric should be understood as any material that is able to resume its original shape when a deforming force is removed.

Examples of such in-mould elastomeric material includes but are not limited to polyisobutylene (PIB), styrene-butadiene rubber (SBR), natural rubber, etc. Others are mentioned elsewhere in the application.

It will be understood that in accordance with embodiments of the invention two or more support side moulds may be comprised in the in-mould support.

Furthermore, it will be understood that two or more support side moulds may be arranged with e.g. one support side mould on one side of the in-mould support and one at the other side of the in-mould support. Such two support side moulds may be arranged such that they essentially each form a half part of the complete support side mould, e.g. each one forming a half part on a respective side of e.g. a longitudinal axis for the mould support, e.g. corresponding to a longitudinal axis along the length of a footwear to be moulded by the footwear moulding system.

According to an embodiment, the at least one support side mould may comprise a support side surface for supporting said in-mould outer surface.

According to an embodiment, the supporting mould may be at least partly manufactured from metal, e.g. aluminium.

According to an embodiment, the in-mould may be manufactured from a first material and the supporting mould may be at least partly manufactured from a second material.

According to an embodiment, the first material may be elastomeric and the second material may be at least partly a metal.

According to an embodiment, the in-mould may be manufactured from one or more polymers.

According to an embodiment, the in-mould may be manufactured from rubber and/or silicone.

According to an embodiment, the in-mould may be manufactured from polymers and/or metal.

According to an embodiment, the in-mould may be manufactured from composite.

According to an embodiment, the in-mould may be manufactured by an additive process, e.g. by 3D printing.

The in-mould may be provided with a release agent for an easier release of the direct injection process material after curing. However, it should be noted that the material of the in-mould also provides an easy release of the in-mould by itself and may only need a small amount of release agent or may not need any release agent.

Rubber may be different types of polymers that are all elastomers, meaning that they recover shape after being stretched or deformed. Rubber has the advantage that over time it will retain its physical properties, such as elongation, memory, tensile and hardness when exposed to temperature increases.

Rubber should be understood as natural rubber and/or synthetic rubber.

Natural rubber, also called India rubber, latex Amazonian rubber, caucho or caoutchouc, comprises the organic compound isoprene. Natural rubber may be harvested mainly in the form of latex from the rubber tree.

Synthetic rubber is any artificial elastomer. They are polymers synthesized from various petroleum-based monomers. Examples of synthetic rubbers are styrene-butadiene rubbers (SBR), polyisoprene, chloroprene and nitrile rubber. Silicone rubber is an inorganic polymer which is resistant to both very low and high temperatures. Another class of synthetic rubber is thermoplastic elastomers which can be moulded easily unlike conventional natural vulcanized rubber.

Silicone or polysiloxane are polymers made up of siloxane and may comprise silicone oil, silicone grease, silicone rubber, silicone resin, and silicone caulk.

The in-mould may be manufactured from any material that is not binding to the direct injection material, e.g. PU.

According to an embodiment, the in-mould may comprise an in-mould bottom and a wall structure having said in-mould outer surface.

According to an embodiment, said wall structure may comprise an upper circumference UC and an inner circumference IC, and wherein the upper circumference is smaller than the inner circumference.

It is noted that according to an embodiment, the in-mould bottom of the in-mould may not cover the complete support bottom mould surface, e.g. inner or central parts of the support bottom mould surface, but will cover at least parts of the support bottom mould surface, e.g. parts near the first and the second support side surfaces in order to enable covering of the joints between e.g. the support bottom mould and the at least one support side mould.

According to an embodiment, the heat conductivity of the in-mould may be less than 1.0 W/(m*K) when measured at 293K.

In an embodiment of the invention, the heat conductivity of the in-mould is between 0.05 and 2.0 W/(m*K), such as between 0.1 and 1.0 W/(m*K) when measured at 293K.

It has been shown that even very low heat conductivities of the in-mould may be acceptable for use in the moulding process. This primarily applies if the in-mould is relatively thin-walled.

This is not a straightforward achievement as temperature control throughout the injection moulding process is typically very important.

According to an embodiment, the injection material, e.g. the footwear sole part material, may comprise PU.

According to an embodiment, the footwear sole part may comprise one or more inserts such as welts, outsole, bottom insert and/or side inserts.

According to an embodiment, the amount of trimming waste between side moulds and bottom mould may be substantially avoided during a direct injection process of a sole to an upper.

Trimming waste should be understood as residues of sole material present on the sole side surface after a direct injection process. Here, sole material flows outwards in the joints of the moulds when closed. Trimming waste is especially found on the front and the back of the sole and across the bottom edge of the sole, that may be manually trimmed after each injection.

Several advantages are obtained by eliminating the trimming process and trimming waste according to embodiments of the invention. By reducing the amount of direct injection process material e.g. PU, savings of PU material, work operations, cleaning operations, and the use of harmful cleaning agents are reduced and/or eliminated.

Injection waste should be understood as the residue of sole material found in the injection channel after a direct injection process.

According to an embodiment, the in-mould may have a protrusion at the top of the in-mould wall and wherein the vertical length VL of the protrusion engaging an upper on a last during a direct injection process may be at least 2 mm, such as at least 3 mm.

In an embodiment of the invention, the vertical length is between 2 mm and 20 mm, such as between 3 mm and 15 mm.

In an embodiment of the invention edges of a first support side protrusion and a second support side protrusion are configured to essentially coincide with the edge of the in-mould protrusion.

Thus, the first support side protrusion and the second support side protrusion are configured to support the in-mould in the upwards direction, e.g. supporting the elastomeric in-mould protrusions. The support protrusions may preferably be designed such that they will contact the footwear upper in the moulding process. In an alternative embodiment, the support protrusions may be somewhat retracted with respect to the in-mould protrusions, e.g. as in FIG. 8c1, but still close enough to the upper in order to support the in-mould protrusion during the complete direct-injection process and thereby avoid that expanding DIP material is pressed between the upper and the in-mould protrusion and out of the in-mould.

In an embodiment of the invention edges of a first support side protrusion and a second support side protrusion are configured to essentially coincide with the edge of the in-mould protrusion around the upper circumference of the in-mould.

In an alternative embodiment, the support protrusions may be somewhat retracted with respect to the in-mould protrusions, around the complete upper circumference of the in-mould, e.g. as illustrated in FIG. 8c1, but still close enough to the upper in order to support the in-mould protrusion during the complete direct-injection process and thereby avoid that expanding DIP material is pressed between the upper and the in-mould protrusion and out of the in-mould around the complete or most of the upper circumference of the in-mould.

In an embodiment of the invention the difference in distance between the in-mould protrusion and the support side protrusion(s) and the upper during at least at part of the direct injection process is less than 3 mm, such as less than 2 mm, such as less than 1 mm.

The invention relates in a second aspect to a direct injection footwear production method for moulding of footwear by use of a moulding system according to the invention, said method comprising the steps of
(a) positioning the in-mould in the supporting mould,
(b) positioning the last, upon which a footwear upper has been placed, in relation to the in-mould and the supporting mould,
(c) moving the last towards the in-mould for contacting the in-mould with the footwear upper to form a mould cavity,
(d) injecting moulding material into the mould cavity, and
(e) upon curing, moving the last with the footwear upper and the attached footwear sole component away, and
(f) removing the in-mould from the footwear sole component, if necessary.

Hereby, a direct injection production method for flexible moulding of footwear is achieved, whereby a range of footwear e.g. different designs, different sizes, different types e.g. left/right, etc. may be produced, e.g. since a particular supporting mould may be used in connection with various sizes, types, designs etc. of in-moulds, and whereby the production may be performed in a cost-efficient manner. The soles manufactured by a direct injection method are not manufactured directly in a moulding cavity defined by mould parts where joints of the mould parts enable material bleeding and consequently necessary trimming operations after the manufacturing. By the invention, the in-mould provides joints free manufacturing, as the in-mould may be configured to cover any joint with its outer surface, whereby material bleeding and trimming operations may be avoided or minimized, leaving e.g. only possible trimming dictated by the injection, e.g. material from an injection channel. Further, operation of the processes is easier, simpler and eliminates cleaning operations where harmful agents might otherwise be used.

Further, by the invention it is achieved that a wide range of designs can be produced by the moulding system without replacing or renewing all parts, such as the side and bottom moulds. Hereby, the moulding tools becomes more reusable where only the in-moulds is changed for the manufacturing of soles with different designs, sizes, etc.

It is noted that the kind of in-mould applied in an embodiment of the present invention makes it possible to geometrically define and DIP (direct-injection process) mould a sole onto a footwear upper by the method using the inventive in-mould, whereby no "bleeding" between two not completely ideal mould parts may be achieved as the in-mould may be provided in one singular non assembled entity covering the complete outsole, including a tight closing of the mould around the complete lower circumference of the upper.

According to an embodiment, the direct injection production method of footwear may further comprise the step of
(g) moving support side moulds of the supporting mould towards each other in connection with step (a), (b) and/or (c).

According to an embodiment, the direct injection production method of footwear may further comprise the step of
(h) moving a support bottom mould towards the last in connection with step (a), (b), (c) and/or (d).

According to an embodiment, the step (0 of removing the in-mould from the footwear sole component may comprise stripping the in-mould off the footwear sole component.

Thus, it is achieved that when e.g. the in-mould has an upper circumference UC and an inner circumference IC, wherein the upper circumference is smaller than the inner circumference, the in-mould may still be readily removed from the sole by stripping it off, e.g. rolling it off from one end, from one side or the like, which is possible due to the elastomeric characteristic of the in-mould. Subsequently, the in-mould can be positioned again in the mould, possibly after cleaning, ready for the moulding of a subsequent sole.

According to an embodiment, the direct injection production method of footwear may further comprise the step of positioning one or more inserts such as welts, outsole, bottom insert and/or side inserts at least prior to step (d) of injecting moulding material into the mould cavity.

Hereby, it may be achieved that various inserts may be in-moulded in the moulded component, e.g. a footwear sole, and whereby furthermore waste may be reduced in relation to the prior art. In the prior art, such inserts are applied with a waste area for trimming, e.g. due to the necessity to trim off trimming waste of the e.g. soles that are moulded according to the prior art. However, in connection with the present invention, such inserts need not have such surplus areas and consequently the waste will thus be further reduced, e.g. since waste from such various inserts will in practice be non-existent.

According to an embodiment, the direct injection production method of footwear may further comprise the step of trimming the moulded footwear sole component, which step comprises trimming of injection waste only.

Since the moulded footwear sole component manufactured by the direct injection process is not manufactured directly in a moulding cavity defined by mould parts where joints of the mould parts enable material bleeding, but by use of the in-mould, joints free manufacturing may be provided, as the in-mould may be configured to cover any joint with its outer surface. Thus, the method according to the invention may prevent material bleeding and it may thus be achieved that trimming operations are avoided or minimized, leaving e.g. only possible trimming dictated by the injection, e.g. material from an injection channel.

According to an embodiment, protrusions of the supporting mould may engage with and support said in-mould in the upwards direction, e.g. in connection with step (c), (d), (e), (g) and/or (h).

Thus, during certain process steps, the e.g. first support side protrusion and the e.g. second support side protrusion may be configured to engage with and support the in-mould in the upwards direction, e.g. supporting the elastomeric in-mould protrusions. This applies for example when the e.g. first support side and the e.g. second support side are moved towards each other such that the in-mould, e.g. protrusions of the in-mould, will contact the footwear upper in the moulding process and furthermore, when moulding material is injected into the mould cavity and e.g. expanded, whereby the elastomeric in-mould and in particular its protrusions may be influenced, e.g. affected upwards. However, due to the support provided by the protrusions of the supporting mould, the elastomeric in-mould and in particular its protrusions may be maintained in the intended positions.

The sole can be manufactured from any materiel such as e.g. thermoplastic Rubber Injection Molding Resin (TPR), Polyvinyl chloride (PVC), polyurethane (PU), Ethylene Vinyl Acetate (EVA) and/or the like suitable for a direct injection process. The sole can also comprise several parts possibly manufactured from different materials. Such parts may be molded into the sole or may be attached to the sole by e.g. an adhesive or the like.

Unless otherwise noted in the present application, the meaning of DIP is to be understood as the process of integrating a sole with an upper or at least a part of an upper by and during a DIP process.

Thus, single elements, e.g. pressure absorbers or sole parts may be DIP'ed in separate processes (without being attached to the sole) and then subsequently be inserted into the mold by means of which the sole or a part of the sole is to be molded and integrated with the upper or at least a part of the upper.

The upper according to embodiments of the invention may be of any material such as e.g. leather, natural leather, textile, reinforcing fabric, reconstructed fibers, woven or non-woven material based on natural or synthetic fibers or any other type of material.

Various exemplary embodiments and details are described hereinafter with reference to the figures when relevant. It should be noted that the figures may or may not be drawn to scale and the figures are only intended to facilitate the description of the embodiments.

THE FIGURES

Figure 3:
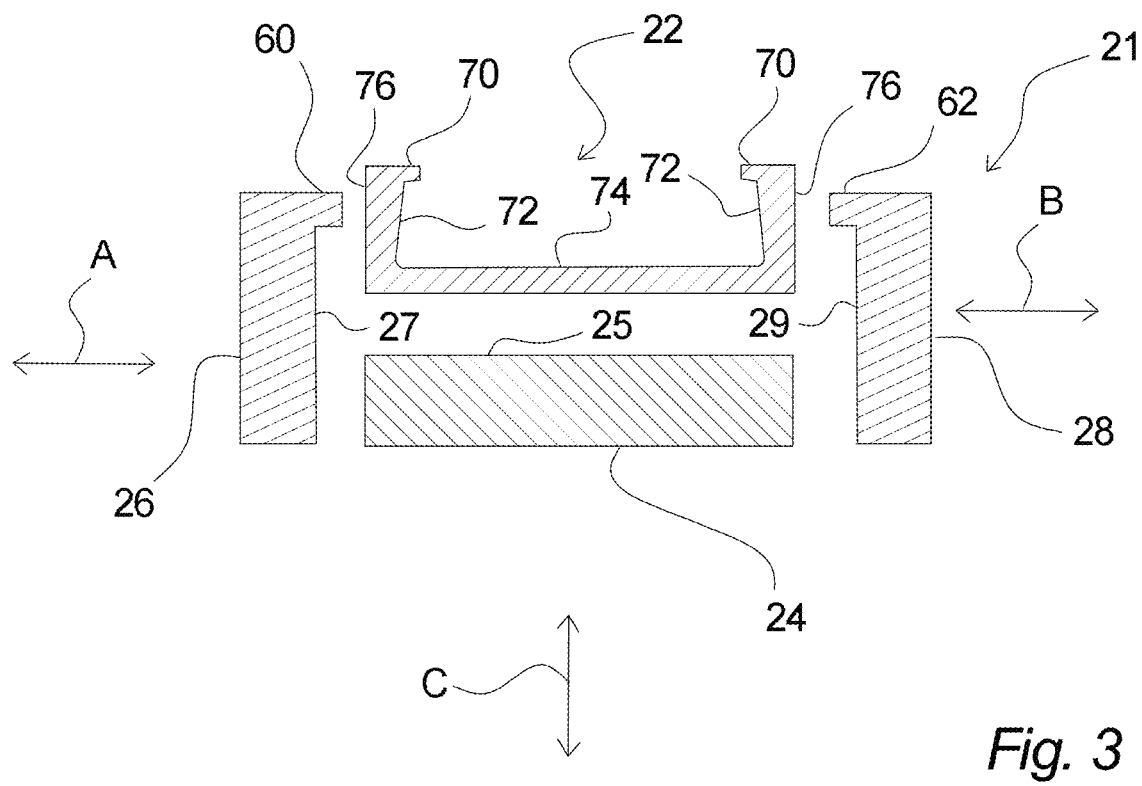
Figure 4:
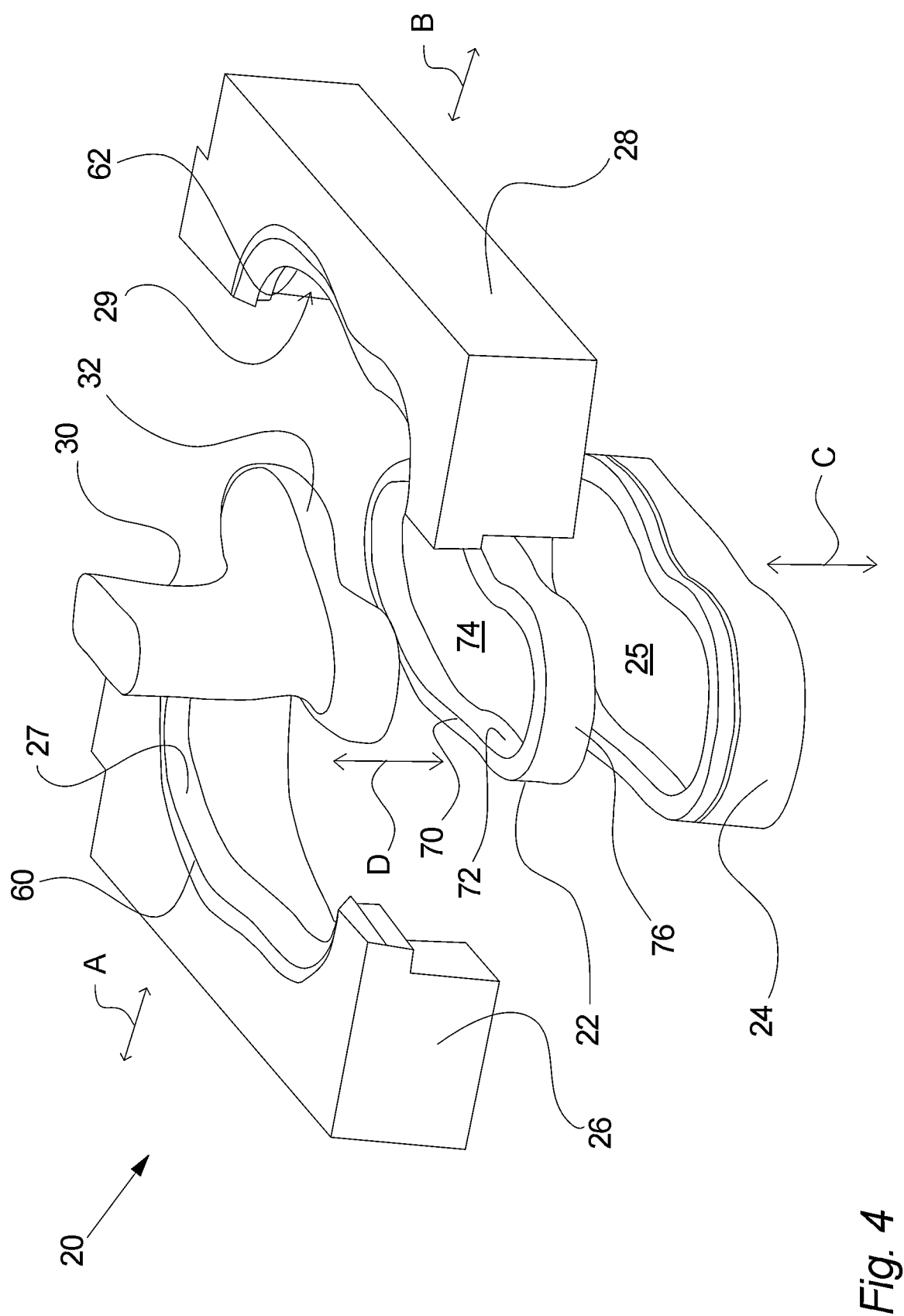
Figure 5:
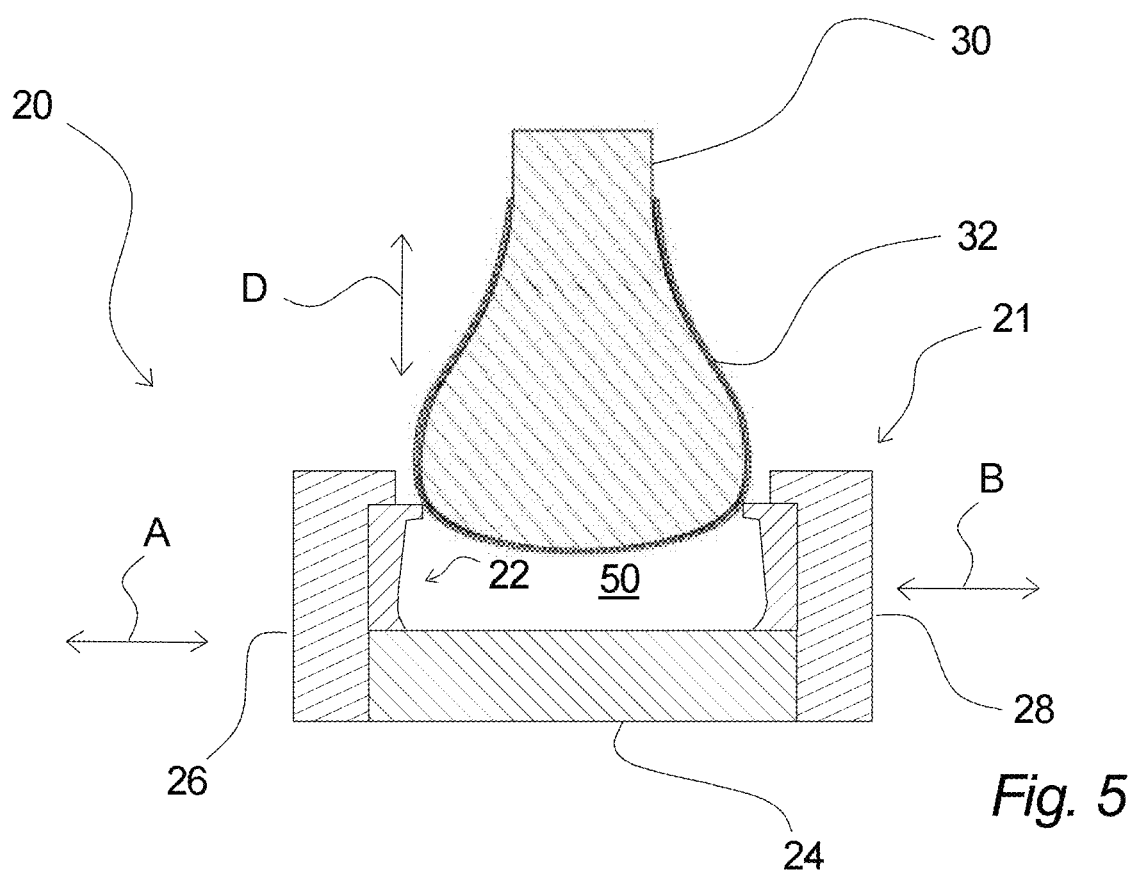
Figure 6:
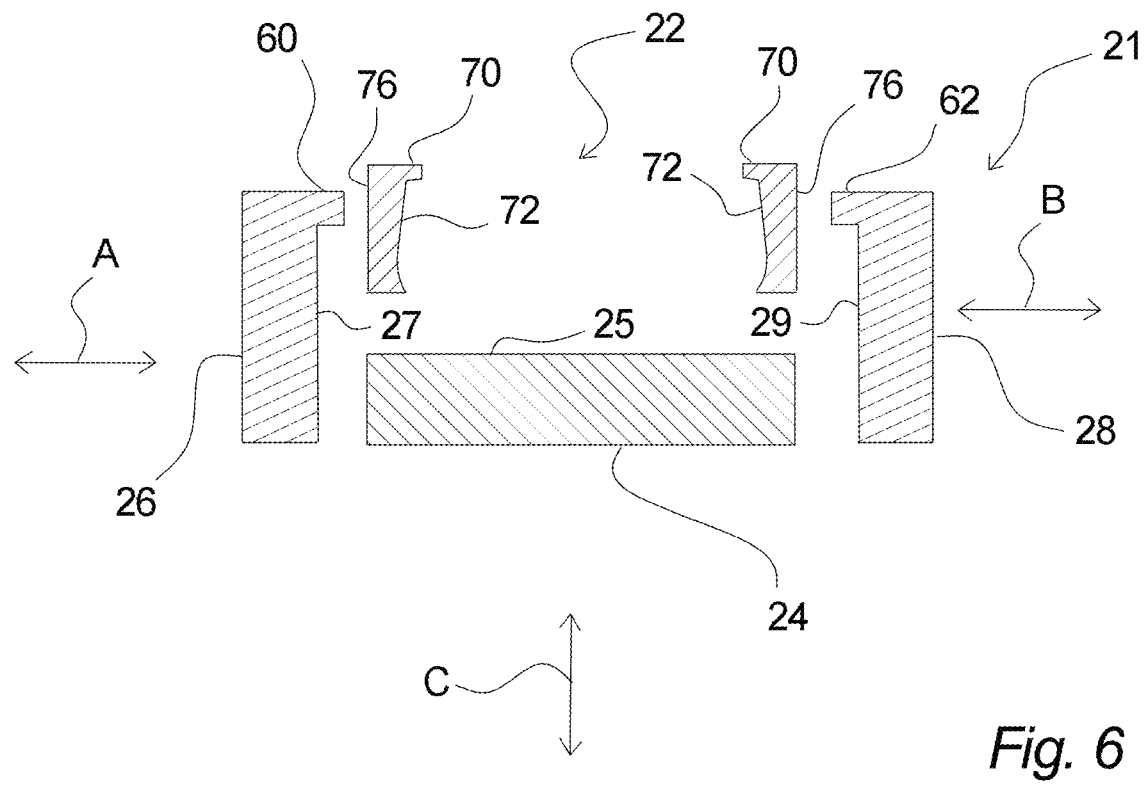

The invention will be explained in further details below with reference to the figures of which FIG. 1a-1c show a schematically illustrated last and mould, seen in a cross-sectional view, as used for direct injection moulding of footwear according to a prior art, FIG. 1d shows corresponding to FIGS. 1a-1c a prior art mould, which is shown in a perspective view, FIG. 1e illustrates an example of excess injected material according to the prior art, FIG. 2 shows a schematically illustrated last and mould, seen in a cross-sectional view, of a direct injection moulding system for DIP footwear manufacturing according to an embodiment of the invention, FIG. 3 shows the supporting mould and the in-mould of the system that has been shown in FIG. 2, FIG. 4 shows corresponding to FIGS. 2 and 3 an example of a direct injection moulding system according to the present disclosure, which is shown in a perspective view, FIG. 5 shows a schematically illustrated last and mould, seen in a cross-sectional view, of a further embodiment of a direct injection moulding system, FIG. 6 shows the supporting mould and the in-mould of the system that has been shown in FIG. 5, FIGS. 7a-h illustrate further embodiments, wherein the option of in-moulding various inserts in the moulded component is utilized, FIGS. 8a1 and 8a2 illustrate a variant of a moulding system within the scope of this disclosure, FIGS. 8b1 and 8b2 illustrate another variant of a moulding system within the scope of this disclosure, FIGS. 8c1 and 8c2 illustrate another variant of a moulding system within the scope of this disclosure, FIGS. 8d1 and 8d2 illustrate another variant of a moulding system within the scope of this disclosure, and FIGS. 8e1 and 8e2 illustrate another variant of a moulding system within the scope of this disclosure.

DETAILED DESCRIPTION

With reference to FIG. 1a, FIG. 1b and FIG. 1c a prior art moulding system will be elucidated. These figures show schematically a prior art mould 2 and a last 30, both seen in a cross-sectional view, which last 30 and mould 2 may be utilized for direct injection moulding of footwear according to a prior art. The mould 2 may have been made out of metal, for example aluminium by e.g. CNC machinery and may as shown in FIG. 1a and FIG. 1b comprise a first side mould 4, a second side mould 8 and a bottom mould 14 which are arranged in such a manner that the mould 2 may be opened and closed, e.g. by the first side mould 4 and the second side mould 8 being able to be moved in horizontal directions as indicated with arrows A, B and by the bottom mould 14 being arranged to be moved in the vertical direction as indicated with the arrow C.

Further, it is shown in FIG. 1a that a footwear upper 32 may be put onto the last 30 and with the footwear upper 32 can be moved in various directions including downwards in relation to the mould 2 as indicated with the arrow D. It will be understood that when performing such a step, it is required that the mould 2 is in an open state in order to allow the last 30 to move into the mould 2. As further shown in FIG. 1a, the first side mould 4 has a first side surface 6 on an inner part, the second side mould 8 has a second side surface 12 on an inner part and the bottom mould 14 has a bottom inner surface 16, which inner surfaces for example may correspond to the design of an outsole for a piece of footwear.

When the last 30 with the footwear upper 32 has been positioned in relation to the mould, the mould 2 may be closed, as illustrated in FIG. 1b, thus forming a mould cavity 50 between the footwear upper 32, the first side mould 4, the second side mould 8, and the bottom mould 14. In this connection, it is noted that interfaces or joints 17 are present between the first and the second side moulds 4 and 8, respectively, and the bottom mould 14 as indicated in FIGS. 1a and 1b, e.g. mating surfaces that at least when the mould is in the closed state are close to each other. Similarly, interfaces or joints between the first side mould 4 and the second side mould 8 will be present, as it later will be explained in connection with FIG. 1d.

The mould 2 is attached to injection moulding equipment (not shown in the figures), by means of which injection material is injected into the mould cavity 50, when the mould is in the closed state or prior to the closed state being reached. In connection with the moulding process, the injected material comes into contact with the first side surface 6, the second side surface 12, the bottom inner surface 16 and the bottom parts of the footwear upper 32 as shown in FIG. 1c. When the injected material has taken the shape of the mould cavity, it is being cured. Due to the closing of the mould, e.g. the reduction of volume to reach the mould cavity 50 and/or due to expansion of the injected material during the injection and/or curing process, injected material may be squeezed out and/or may creep out along the interfaces 17 (and/or 18, as it later will be explained) between the mating surfaces of the first side mould 4 and the bottom mould 14 and/or between the mating surfaces of the second side mould 8 and the bottom mould 14, in case imperfections are present in the mating surfaces and/or in case the surfaces otherwise are not in complete contact. This may also be referred to as "bleeding". Thus, excess injected material 19 may thus, as indicated with arrows in FIG. 1c, be stretching from the moulded object, e.g. an outsole along the perimeter. Subsequently, excess injected material is removed by e.g. a trimming process. Possibly, in order to facilitate the quality of the trimming effect, a slight trimming of the part of the e.g. outsole, from which the excess injected material 19 stretches, may be performed as well.

To further elucidate a prior art mould 2, such a mould is shown in a perspective view in FIG. 1d, showing a mould 2 and a last 30 essentially of the same configuration as has been shown in FIGS. 1a-1c. Thus, the mould 2 is shown in an open state with the first side mould 4 and the second side mould 8 being removed from each other and each removed from the bottom mould 14. As shown, the two side moulds may essentially be seen as two half parts that in the closed state (as shown in FIGS. 1b and 1c) meet each other at the toe part and the heel part by mating interfaces 18 or joints as indicated in FIG. 1d, which mating interfaces 18 or joints may be essentially vertical or may have other forms. As furthermore shown, an injection channel 40, schematically shown in FIG. 1d, is arranged in the mating parts of the interface 18. In analogy with what was explained in connection with the interfaces or joints 17 of the side moulds and the bottom mould, it will be understood that when the mould 2 is being closed or has been closed, reduction of volume to reach the mould cavity 50 and/or expansion of the injected material during the injection and/or curing process, may effect injected material to be squeezed out and/or to creep out along the interfaces 18 between the mating surfaces of the first side mould 4 and the second side mould 8, in case imperfections are present in the mating surfaces and/or in case the surfaces otherwise are not in complete contact. Such excess injected material 19 (not shown in FIG. 1d) may be stretching from the moulded object, e.g. an outsole at the toe end as well as at the heel end. Such excess injected material may also be referred to as "trimming waste" 19a. At one end, e.g. at the heel end as shown in FIG. 1d, excess material from the injection channel 40 will also be present, which may be referred to as "injection waste" 19b. Subsequently, such excess injected material is removed by e.g. a trimming process.

FIG. 1e illustrates an example of a moulded part that has been manufactured according to the prior art, e.g. a footwear sole, which is seen downside up in a perspective view and from behind. Here, examples of such excess injected material 19 is shown, e.g. excess material that has been bleeding along the perimeter of the sole and/or from the mating surfaces at the toe and/or heel end, which excess material may be referred to as trimming waste 19a, and excess material that is caused by the injection channel and may be referred to as injection waste 19b.

With a view to the prior art as generally described above as background art, embodiments of the present invention will be explained in the following, Thus, further details of the mould and the moulding process will be understood from the following, wherein a mould and the moulding process will be elucidated in connection with the FIGS. 2-8 that illustrate direct injection equipment and a direct injection process as utilized in connection with the present disclosure.

FIG. 2 shows a moulding system according to embodiments of the invention. This figure shows schematically a mould 20, which mould 20 comprises a supporting mould 21 and an in-mould 22, and a last 30 seen in a cross-sectional view, which last 30 and mould 20 comprising the supporting mould 21 and the in-mould 22 may be utilized for direct injection moulding of footwear according to embodiments of the invention. The supporting mould 21 may have been made out of metal, for example aluminium by e.g. CNC machinery and may as shown in FIG. 2 comprise a first support side mould 26, a second support side mould 28 and a support bottom mould 24 which are arranged in such a manner that the supporting mould 21 may be opened and closed, e.g. by the first support side mould 26 and the second support side mould 28 being able to be moved in horizontal directions as indicated with arrows A, B and by the support bottom mould 24 being arranged to be moved in the vertical direction as indicated with the arrow C.

Furthermore, the in-mould 22 may have been made out of an elastomeric material, for example rubber or silicone, etc. The elastomeric material may furthermore be selected in view of its ability of not bonding with the material being injected into the mould cavity 50, e.g. polyurethane (PU).

Further, it is shown in FIG. 2 that a footwear upper 32 may be put onto the last 30 and the last 30 with the footwear upper 32 can be moved in various directions including downwards in relation to an in-mould 22 as indicated with the arrow D.

The mould 20 is attached to injection moulding equipment (not shown in the figure), by means of which injection material is injected into the mould cavity 50. Here, the injected material will contact the surfaces of the mould cavity 50 and the bottom parts of the footwear upper 32 during the processing that may involve relative movements of the first and second support side moulds 26, 28, the support bottom mould 24 and the last 30 carrying the footwear upper 32 as it later will be exemplified. When the injected material has taken the shape of the mould cavity, it is being cured.

FIG. 3 shows the supporting mould 21 and the in-mould 22 that has been shown in FIG. 2, but where in FIG. 3 the parts have been moved from each other. As it has been described, the first support side mould 26 and the second support side mould 28 are movable in relation to each other and in relation to the support bottom mould 24. The first support side mould 26 has as shown a first support side surface 27 and correspondingly, the second support side mould 28 has a second support side surface 29, which are configured for supporting the outer surface 76 of the in-mould 22. Further, the first support side mould 26 has a first support side protrusion 60 and the second support side mould 28 has a second support side protrusion 62, each of these protrusions being configured to support the in-mould 22 in the upwards direction, e.g. supporting in-mould protrusions 70 that are designed such that they will contact the footwear upper 32 in the moulding process. Furthermore, the support bottom mould 24 has a support bottom mould surface 25, upon which the in-mould 22, e.g. the in-mould bottom 74 may be supported. Even further, the in-mould 22 has as indicated an in-mould inner surface 72, which together with the in-mould bottom 74 and the footwear upper 32 carrying last 30 may define the mould cavity 50 and thus also the design of the part to be moulded, e.g. a footwear sole, according to this embodiment, when the in-mould 22 is supported by the supporting mould 21.

FIG. 4 shows corresponding to FIGS. 2 and 3 an example of a direct injection moulding system according to the present disclosure, which is shown in a perspective view. Thus, a mould 20, an in-mould 22 and a last 30 essentially of the same configuration as has been shown in FIGS. 2-3 are illustrated here. The mould 20 is shown in an open state with the first support side mould 26 and the second support side mould 28 being removed from each other and each removed from the support bottom mould 24. As shown, the two support side moulds 26, 28 may essentially be seen as two half parts that in the closed state (as shown in FIG. 5) meet each other at the toe part and the heel part by mating interfaces. Further, the in-mould 22 is shown here above the support bottom mould 24, where it is seen that the in-mould 22 comprises an in-mould inner surface 72, which is part of a continuous wall structure that on the outside comprises the in-mould outer surface 76. Further, at a top part of this continuous wall structure the in-mould comprises the above-mentioned in-mould protrusion 70. Further, it is shown that the in-mould 22 has an in-mould bottom 74, which in an operative position may be supported by the support bottom mould surface 25. Also, it is shown that the first support side mould 26 comprises the first support side surface 27 and that the second support side mould 28 comprises the corresponding second support side surface 29. Even further, it is shown that the first support side mould 26 comprises the first support side protrusion 60 and that the second support side mould 28 comprises the corresponding second support side protrusion 62.

It will thus be understood that for manufacturing e.g. a piece of footwear, the in-mould 22 may be positioned on the support bottom mould 24, e.g. on the support bottom mould surface 25 and that the two support side moulds 26, 28 may be moved together to close the mould, while the last 30 with the upper 32 is moved into a relative position to form the mould cavity 50 for subsequent moulding of a sole in a DIP process. Thus, the in-mould outer surface 76 will eventually be supported by the first support side surface 27 and the second support side surface 29, while the in-mould protrusion 70 will be supported in the vertical direction by the first support side protrusion 60 and the second support side protrusion 62.

Furthermore, it will be seen that the joints or interfaces of the two support side moulds 26, 28 and support bottom mould 24 will be closed off by the in-mould 22 that will hinder the injected materiel from being squeezed out, from creeping out or otherwise escaping or bleeding from the mould cavity, which effect will furthermore be enhanced due to the elastomeric characteristics of the in-mould 22. Thus, the amount of trimming waste 19*a* may be considerably reduced if not completely avoided, leaving only the injection waste 19*b* to be trimmed off.

It is noted that subsequent to curing of the moulded component, the two support side moulds 26, 28 and/or the support bottom mould 24 may be moved from each other to allow the last 30 and the upper 32 with the now joined moulded component, e.g. a sole to be lifted. The in-mould 22 may follow the e.g. moulded sole, but may easily be removed, e.g. due to its elastomeric character. It will be understood that any cleaning of the supporting mould 21, e.g. the two support side moulds 26, 28 and/or the support bottom mould 24 will be reduced to a minimum since the in-mould 21 covers these and defines the mould cavity. Also, it is noted that since the elastomeric in-mould 21 is made of material, to which the injected material, e.g. PU, does not bond, cleaning of the in-mould itself may be reduced to a minimum. Even further, it is noted that by the use of an in-mould 21, the moulded component, e.g. the sole, may be designed to have e.g. sharper edges, etc. as opposed to the prior art design, where e.g. joints or the like of the side moulds and the bottom mould may be limiting factors as regards distinctiveness of the design.

Further embodiments of the mould 20, e.g. the supporting mould 21 and the in-mould 22 will be explained with reference to FIGS. 5 and 6, which correspond to FIGS. 2 and 3, but where it is shown that the in-mould 22 may be constructed with a non-complete in-mould bottom 74 or even a missing in-mould bottom.

As shown in FIGS. 5 and 6, the in-mould 22 may comprise the wall structure that surrounds the mould cavity 50 and has the in-mould outer surface 76, that is supported by the first and second support side surfaces 27, 29, and the in-mould inner surface 72 that provides the design and/or design elements of the mould cavity in the horizontal directions, e.g. the side of soles for footwear. Apart from the lower part of the wall structure that rests on the support bottom mould surface 25, the in-mould may not necessarily have further bottom parts, which requires that the support bottom mould surface 25 is configured to define e.g. more or less of the downward facing part of the mould cavity 50.

Further embodiments of the invention will be exemplified with reference to FIGS. 7*a*-7*h*, wherein the option of in-moulding various inserts in the moulded component, e.g. the moulded sole part 80, is utilized as it will be explained in the following.

Figure 7A:
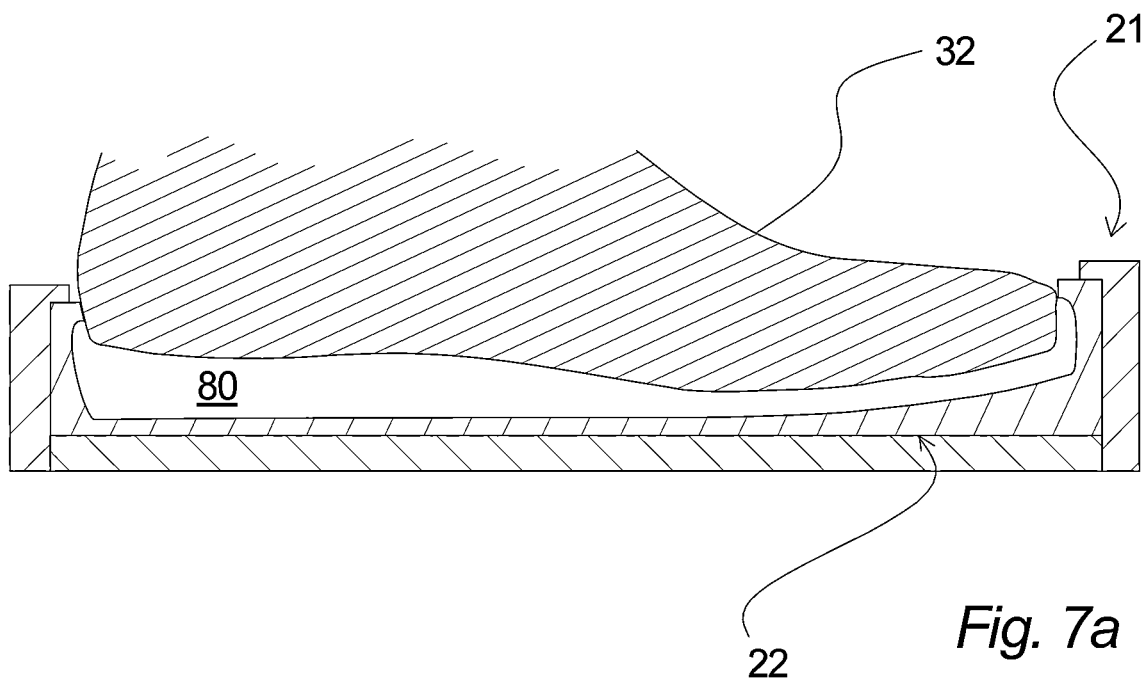

FIG. 7*a* is a schematically shown sectional view in the longitudinal direction of a piece of footwear being manufactured by a DIP production and where a mould system according to the present disclosure is utilized. Thus, an upper 32 is shown, which is in operative engagement with a supporting mould 21, wherein an in-mould 22 is positioned, by means of which system a moulded sole part 80 is being made and moulded directly to the upper 32. Further advantages may be achieved when various inserts are being placed in various places in the in-mould 22 prior to the injection material being injected as it will be exemplified in the following. The inserts, of which one or more may be inserted, may be made of material that will bond with the material being injected, e.g. polyurethane (PU) or other suitable materials. None of these inserts have been illustrated in FIG. 7*a* for reasons of clarity.

FIG. 7*b*-7*h* are transverse sectional views of the manufacturing system as shown in FIG. 7*a*, but in a slightly enlarged view, thus showing a transverse view of an upper 32 engaged in a supporting mould 21, wherein an in-mould 22 is positioned in order to manufacture a moulded sole part.

Figure 7B:
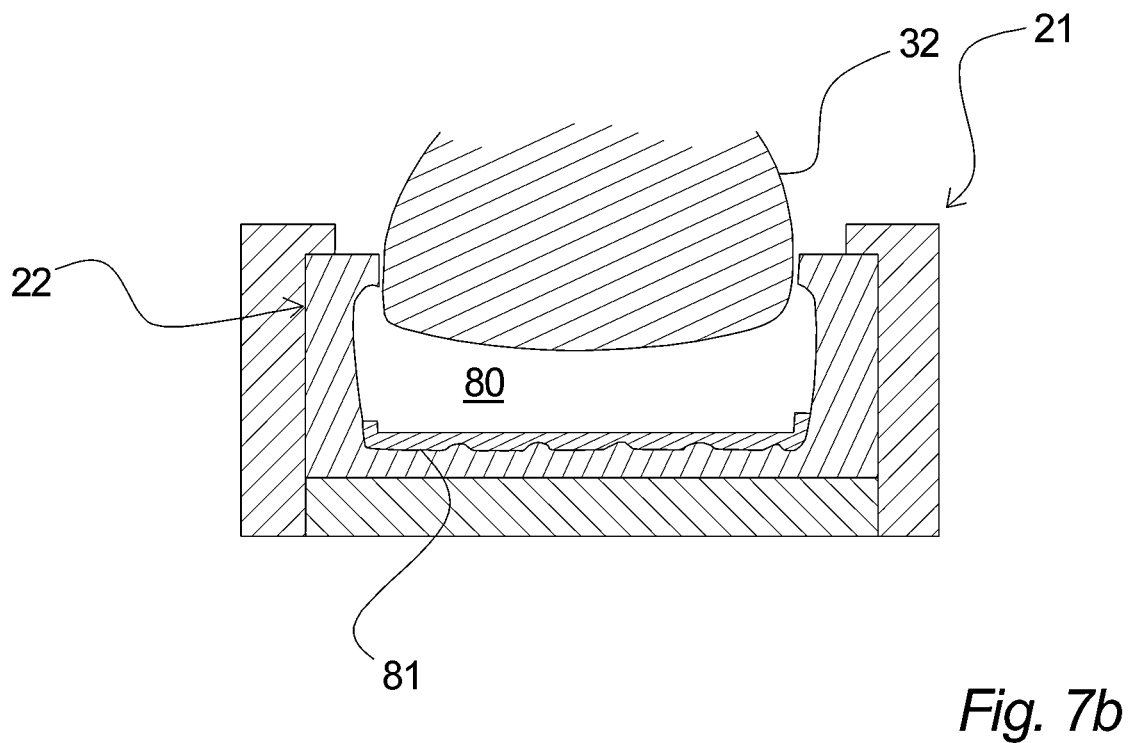

In FIG. 7*b* an outsole insert 81 has been placed inside the in-mould 21, which outsole insert 81 can be made in all types of materials that are bonding with the material being injected, e.g. polyurethane (PU) or other suitable materials.

Figure 7C:
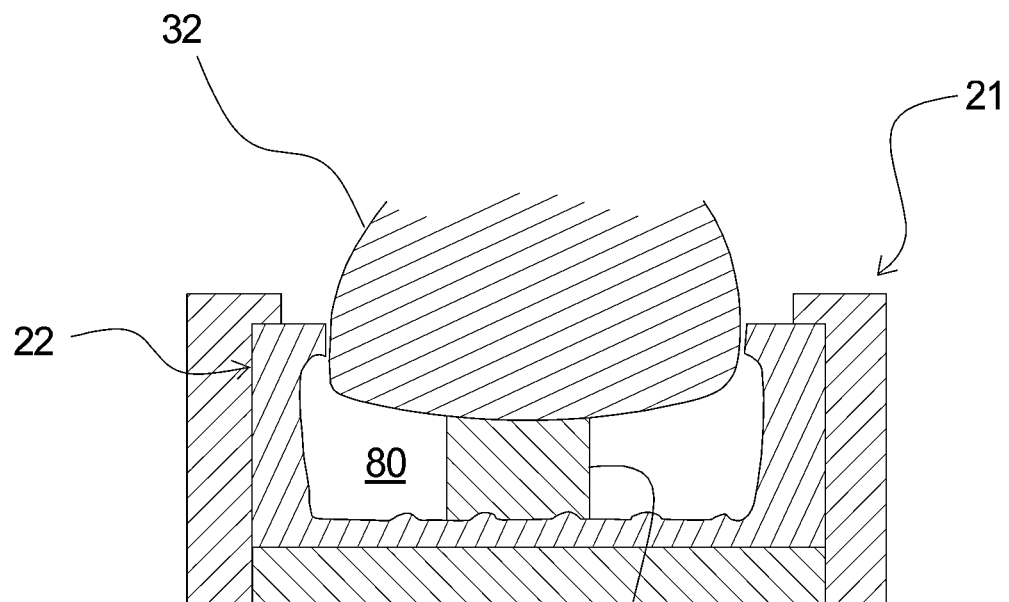

The same applies to the full bottom insert 82 that as shown in FIG. 7*c* has been placed inside the in-mould 21. It is further noted that the full bottom insert 82 may be placed in different places in the sole 80.

Figure 7D:
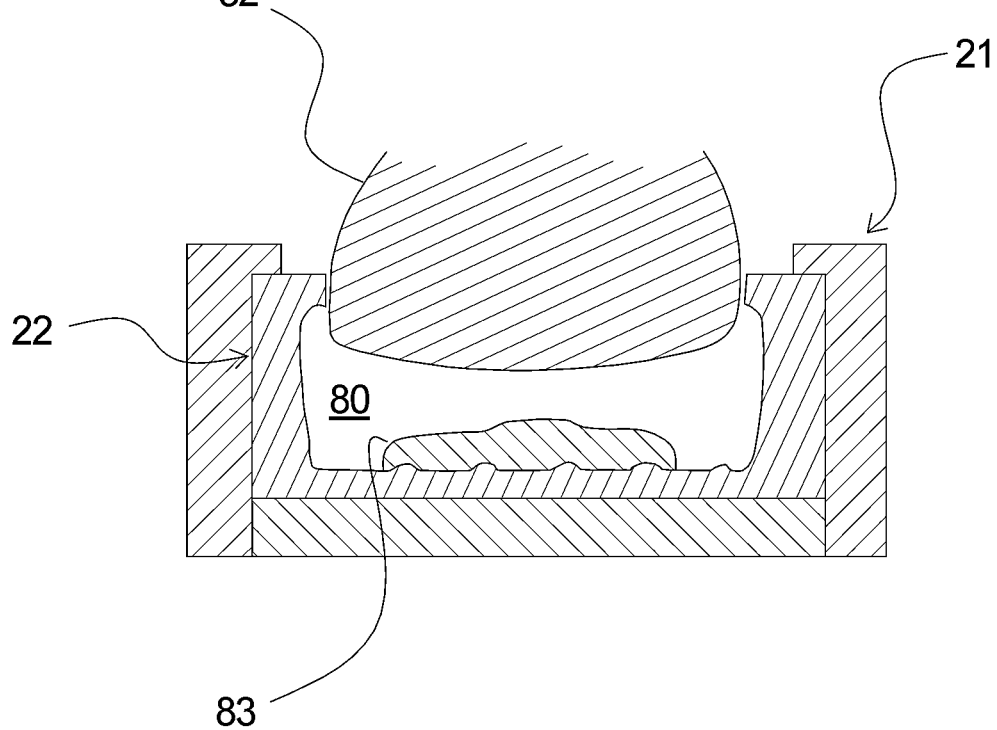

Similar applies as regards the partly bottom insert 83 that as shown in FIG. 7*d* has been placed inside the in-mould 21 in different places.

Figure 7E:
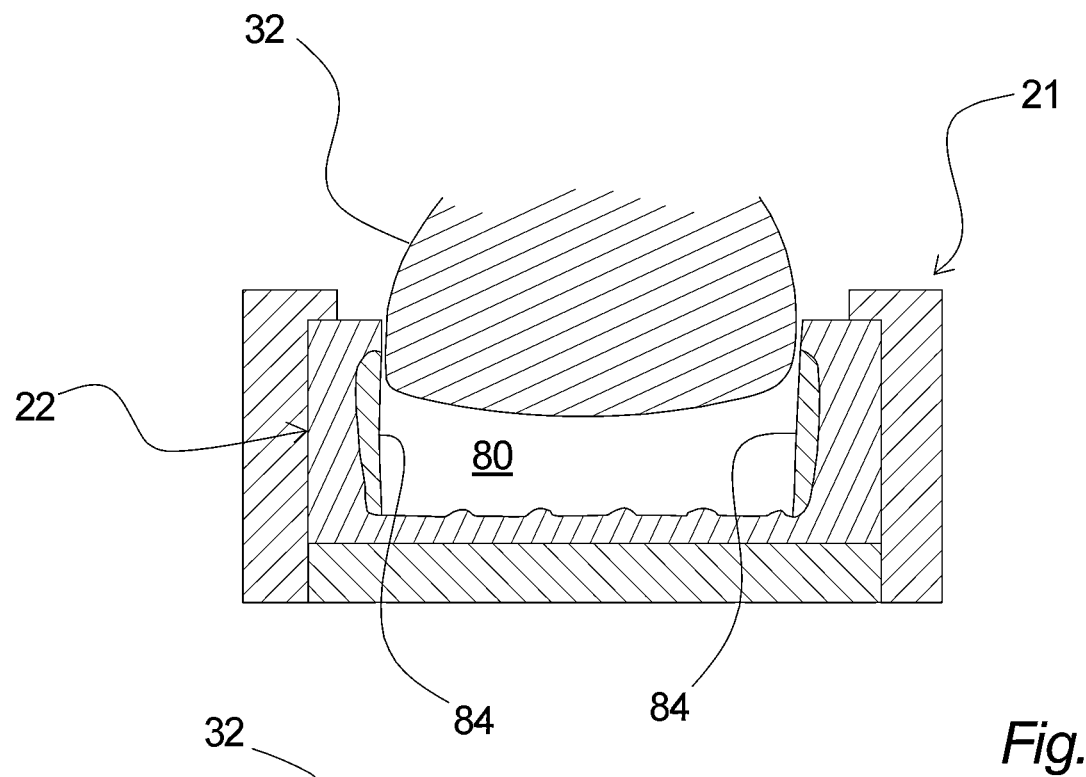

In FIG. 7*e* full inserts 84 are shown, having been placed in the in-mould. It is noted that the full inserts 84 may be made in all types of materials that are bonding with the material being injected, e.g. polyurethane (PU) or other suitable materials. This may include materials such as leather, leather foil etc. being made in one or more layers. Also it is noted that one or more full inserts 84 may be placed in different places in the sole.

Figure 7F:
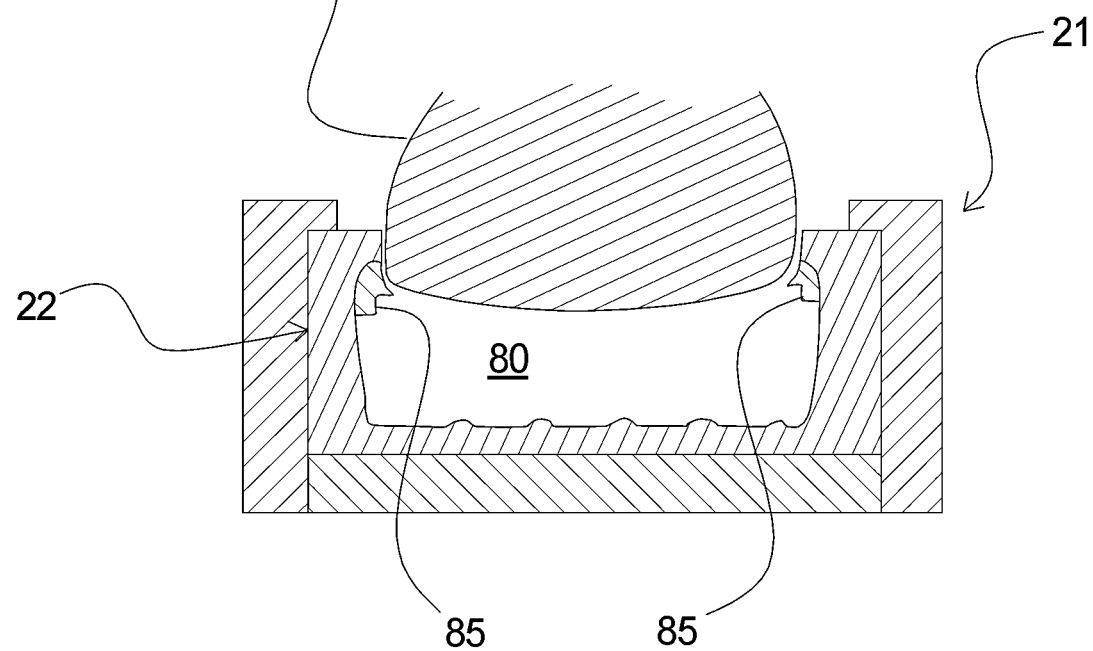

In FIG. 7*f* partly inserts 85 are shown, having been placed in the in-mould. It is noted that the partly inserts 85 may be made in all types of materials that are bonding with the material being injected, e.g. polyurethane (PU) or other suitable materials. This may include materials such as leather or lefa welt, leather foil etc. being made in one or more layers. Also, it is noted that one or more partly inserts 85 may be placed in different places in the sole.

Figure 7G:
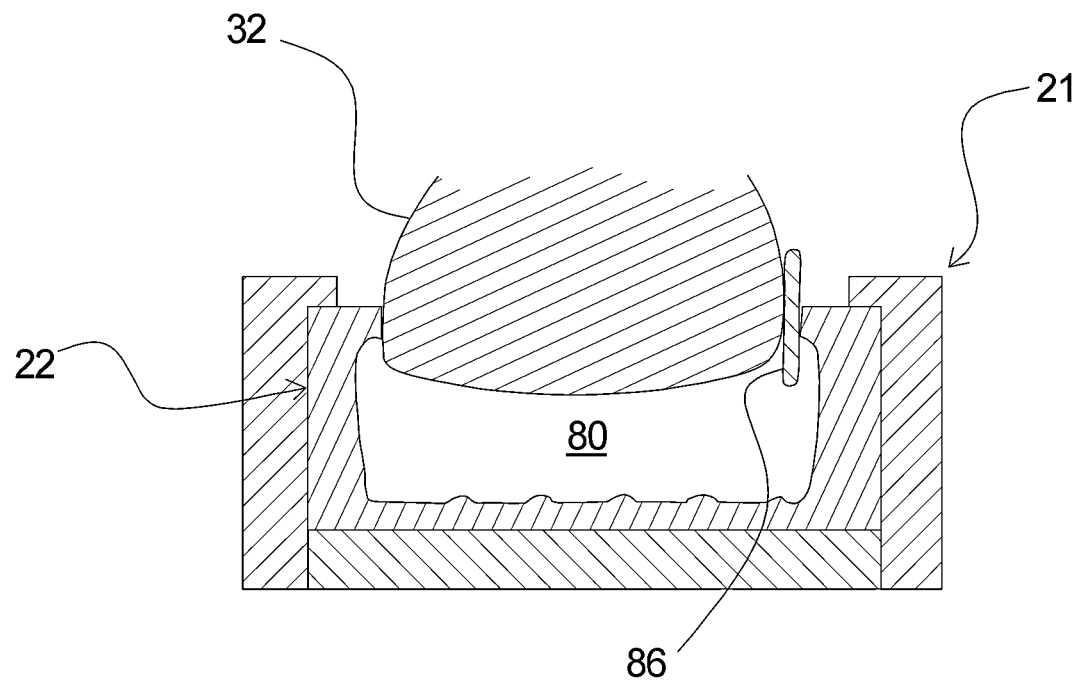

In FIG. 7*g* inserts are shown that are inserts that continue above the sole 86. It is noted that these inserts 86 may be made in all types of materials that are bonding with the material being injected, e.g. polyurethane (PU) or other suitable materials. Also, it is noted that one or more of these inserts 86 may be placed in different places in the sole, e.g. at the toe, at the heel, at the side, e.g. the inside or the outside.

Figure 7H:
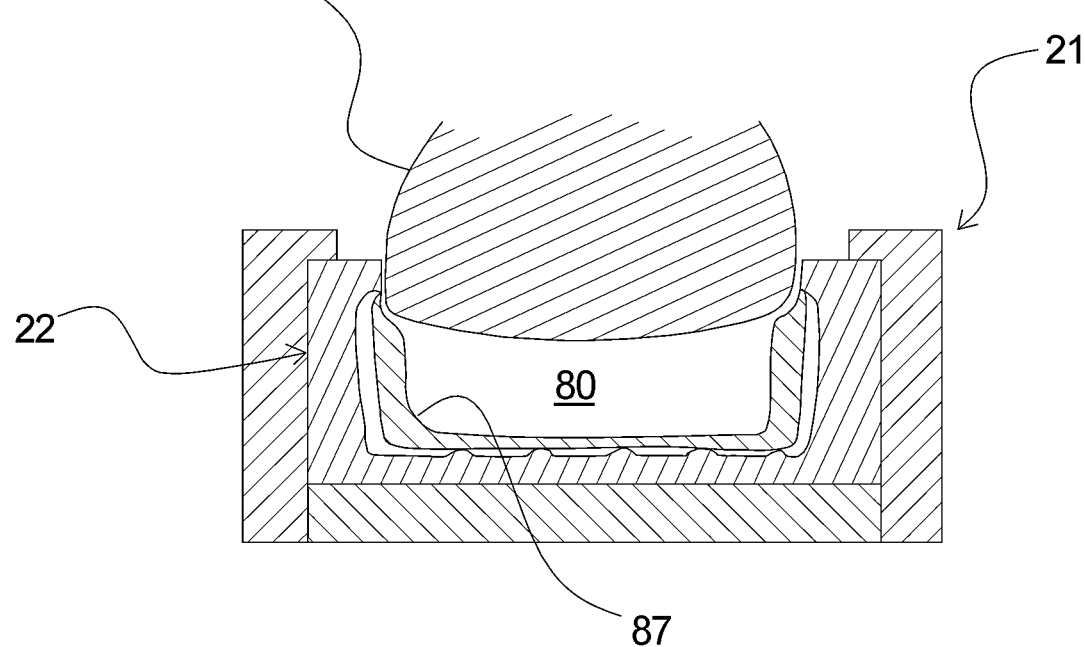

FIG. 7*h* illustrates that different types of inserts may be placed in the in-mould 22, e.g. inserts heel cover+flick 87. As noted in connection with the previous examples, the inserts heel cover+flick 87 may be made in all types of materials that are bonding with the material being injected, e.g. polyurethane (PU) or other suitable materials.

It is noted that by these in-moulding techniques of various inserts in the moulded component, waste may be reduced in relation to the prior art, where such inserts are applied with a waste area for trimming, e.g. due to the necessity to trim off trimming waste of the e.g. soles that are moulded according to the prior art. Thus, in connection with the present invention, such inserts need not have such surplus areas and the waste will thus be further reduced.

FIGS. 8*a*1, 8*a*2, 8*b*1, 8*b*2, 8*c*1, 8*c*2, 8*d*1, 8*d*2, 8*e*1, and 8*e*2 illustrate different variants of a moulding systems within the scope of the invention. Each of these figures illustrate a horizontal sectional view of a mould 20 and a corresponding last 30, designated FIG. 8*a*1-8*e*1, respectively, and correspondingly a schematic view from above, designated FIG. 8*a*2-8*e*2, respectively, where in these FIGS. 8*a*2-8*e*2 the section shown in FIGS. 8*a*1-8*e*1, respectively, has been indicated.

As shown in FIG. 8*a*1, the mould 20 is in a closed state with the in-mould and the last (i.e. an upper on the last) defining a mould cavity. Here, the first support side protrusion 60 and the second support side protrusion 62 are shown together with an indication of the distance 90 between these. Furthermore, the in-mould protrusions 70 are shown, together with the distance 91 between these. Finally, the distance 92 at this position between in-mould inner surfaces is indicated. These distances 90, 91 and 92 are also indicated at FIG. 8*a*2, where furthermore the upper circumference UC of the in-mould, as made up by the in-mould protrusion 70, is shown together with the inner circumference IC made up by the in-mould inner surfaces. As it can be seen, the inner circumference IC is larger than the upper circumference UC and it will be understood that after moulding and curing of a sole, the in-mould will need to be removed from the sole by stripping it off, which is possible due to the elastomeric characteristic of the in-mould, which subsequently can be positioned again in the mould, ready for the moulding of a subsequent sole.

It is noted that the protrusion 70 of the in-mould, e.g. at the top of the in-mould wall, may have a vertical length VL as indicated in FIG. 8*a*1, where the protrusion engages an upper on a last 30 during a direct injection process.

A further embodiment is shown in FIGS. 8*b*1 and 8*b*2, wherein the first support side protrusion 60 and the second support side protrusion 62 are configured with a decreasing height towards its inner edge, which essentially coincides with the edge of the in-mould protrusion 70. Thus, it will be seen that the distance 90 is the same as the distance 91 (not shown). This is also indicated in FIG. 8*b*2, where it further is shown that the inner circumference IC is larger than the upper circumference UC, meaning that after moulding and curing of a sole, the in-mould will need to be removed from the sole by stripping it off, e.g. by taking advantage of its elastomeric property.

A still further embodiment is shown in FIGS. 8*c*1 and 8*c*2, wherein a further example of the configuration of the first support side protrusion 60, the second support side protrusion 62 and the in-mould with its in-mould protrusions 70 are shown, configured such that the distance 90 here will be smaller than the distance 92, and where the inner circumference IC is larger than the upper circumference UC, meaning that after moulding and curing of a sole, the in-mould will need to be removed from the sole by stripping it off, e.g. by taking advantage of its elastomeric property as for the previously described examples.

FIGS. 8*d*1 and 8*d*2 show an embodiment, which corresponds to the embodiment shown in FIGS. 8*b*1 and 8*b*2, where the edges of the first support side protrusion 60 and the second support side protrusion 62 are configured to essentially coincide with the edge of the in-mould protrusion 70, but where the first support side protrusion 60 and the second support side protrusion 62 has essentially the same height along their length. Thus, the distance 90 here also will be smaller than the distance 92, and the inner circumference IC is larger than the upper circumference UC, meaning that after moulding and curing of a sole, the in-mould will need to be removed from the sole by stripping it off, e.g. by taking advantage of its elastomeric property as for the previously described examples.

Further, FIGS. 8*e*1 and 8*e*2 show an embodiment, where the in-mould is void of any specific protrusions, but has an inner wall that essentially coincides with the edges of the first support side protrusion 60 and the second support side protrusion 62. Furthermore, the inner wall is essentially vertical, thus meaning that the distances 90, 91 and 92 essentially are equal and furthermore, the inner circumference IC in general corresponds to the upper circumference UC, whereby after moulding and curing of a sole, the in-mould may readily be removed from the sole, without necessarily taking particular advantage of the elastomeric property of the in-mould.

It is noted that the protrusion 70 of the in-mould, e.g. at the top of the in-mould wall, may have a vertical length VL as indicated in FIG. 8*a*1, where the protrusion engages an upper on a last 30 during a direct injection process that may be at least 2 mm, such as at least 3 mm. In an embodiment of the invention, the vertical length may be between 2 mm and 20 mm, such as between 3 mm and 15 mm.

In the above description, various embodiments of the invention have been described with reference to the drawings, but it is apparent for a person skilled within the art that the invention can be carried out in an infinite number of ways, using e.g. the examples disclosed in the description in various combinations, and within a wide range of variations within the scope of the appended claims.

LIST OF REFERENCE NUMBERS

2 Prior art mould
4 First side mould
6 First side surface
8 Second side mould
12 Second side surface
14 Bottom mould
16 Bottom inner surface
17 Interface—side mould to bottom mould
18 Interface—side mould to side mould
19 Excess injected material
19a Trimming waste
19b Injection waste
20 Mould
21 Supporting mould
22 In-mould
24 Support bottom mould
25 Support bottom mould surface
26 First support side mould
27 First support side surface
28 Second support side mould
29 Second support side surface
30 Last
32 Footwear upper
40 Injection channel 50 Mould cavity
60 First support side protrusion
62 Second support side protrusion
70 In-mould protrusion
72 In-mould inner surface
74 In-mould bottom
76 In-mould outer surface
80 Moulded sole part
81 Outsole insert
82 Full bottom insert
83 Partly bottom insert
84 Full inserts
85 Partly inserts
86 Inserts—continues above sole
87 Inserts heel cover+flick
90 Distance between first and second support side protrusion
91 Distance between in-mould protrusions
92 Distance between in-mould inner surfaces
VL Vertical length of protrusion
UC Upper circumference
IC Inner circumference

The invention claimed is:

1. A footwear moulding system for direct injection production of footwear, said moulding system comprising:
    a supporting mould,
    a last,
    an in-mould, and
    an injection channel,
    wherein the supporting mould comprises at least an in-mould support,
    wherein the in-mould is elastomeric and wherein the in-mould comprises an in-mould outer surface configured to be supported by said in-mould support,
    wherein the in-mould support comprises at least one support side mould and a support bottom mould,
    wherein the in-mould is configured to cover joints of said in-mould support, and
    wherein the in-mould comprises a wall structure having said in-mould outer surface, the wall structure of the in-mould support being a monolithic structure.

2. The footwear moulding system according to claim 1, wherein the at least one support side mould comprises a support side surface for supporting said in-mould outer surface.

3. The footwear moulding system according to claim 1, wherein the in-mould is manufactured from a first material and the supporting mould is at least partly manufactured from a second material.

4. The footwear moulding system according to claim 3, wherein the first material is elastomeric and wherein the second material is at least partly a metal.

5. The footwear moulding system according to claim 1, wherein the in-mould is manufactured from one or more polymers.

6. The footwear moulding system according to claim 1, wherein the in-mould is manufactured from rubber or silicone.

7. The footwear moulding system according to claim 1, wherein the in-mould is manufactured by an additive process.

8. The footwear moulding system according to claim 1, wherein a lower part of the of the in-mould is configured to be supported by the support bottom mould.

9. The footwear moulding system according to claim 1, wherein a surface part of the support bottom mould is configured to define at least a part of a downward facing part of a mould cavity.

10. The footwear moulding system according to claim 1, wherein a heat conductivity of the in-mould is less than 1.0 W/(m*K) when measured at 293K.

11. The footwear moulding system according to claim 1, wherein an injection material comprises PU.

12. The footwear moulding system according to claim 1, wherein a footwear sole part comprises one or more inserts such as welts, outsole, bottom insert or side inserts.

13. The footwear moulding system according to claim 1, wherein the in-mould has a protrusion at a top of the wall structure of the in-mould and wherein a vertical length (VL) of the protrusion engaging an upper on the last during a direct injection process is at least 2 mm.

14. The footwear moulding system according to claim 1, where edges of a first support side protrusion and a second support side protrusion are configured to essentially coincide with an edge of an in-mould protrusion.

15. A direct injection footwear production method for moulding of footwear by use of a footwear moulding system according to claim 1, said method comprising steps of:
    (a) positioning the in-mould in the supporting mould,
    (b) positioning the last, upon which a footwear upper has been placed, in relation to the in-mould and the supporting mould,
    (c) moving the last towards the in-mould for contacting the in-mould with the footwear upper to form a mould cavity,
    (d) injecting moulding material into the mould cavity,
    (e) upon curing, moving the last with the footwear upper and an attached footwear sole component away, and
    (f) removing the in-mould from the footwear sole component, if necessary.

16. The direct injection footwear production method for moulding of footwear according to claim 15, further comprising the step of
    (g) moving support side moulds of the supporting mould towards each other in connection with step (a), (b) or (c).

17. The direct injection footwear production method for moulding of footwear according to claim 15, further comprising the step of
    (h) moving the support bottom mould towards the last in connection with step (a), (b), (c) or (d).

18. The direct injection footwear production method for moulding of footwear according to claim 15, wherein step (f) of removing the in-mould from the footwear sole component comprises stripping the in-mould off the footwear sole component.

19. The direct injection footwear production method for moulding of footwear according to claim 15, further comprising the step of positioning one or more inserts such as welts, outsole, bottom insert or side inserts at least prior to step (d) of injecting moulding material into the mould cavity.

20. The direct injection footwear production method for moulding of footwear according to claim 15, further comprising the step of trimming the moulded footwear sole component, which step comprises trimming of injection waste only.

* * * * *